(12) United States Patent
Son

(10) Patent No.: US 12,498,240 B2
(45) Date of Patent: Dec. 16, 2025

(54) ROUTE GUIDANCE DEVICE AND ROUTE GUIDANCE SYSTEM

(71) Applicant: LG ELECTRONICS INC., Seoul (KR)

(72) Inventor: Jinho Son, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 265 days.

(21) Appl. No.: 18/039,909

(22) PCT Filed: Nov. 30, 2021

(86) PCT No.: PCT/KR2021/017831
§ 371 (c)(1),
(2) Date: Jun. 1, 2023

(87) PCT Pub. No.: WO2022/119267
PCT Pub. Date: Jun. 9, 2022

(65) Prior Publication Data
US 2024/0003700 A1    Jan. 4, 2024

(30) Foreign Application Priority Data
Dec. 1, 2020 (KR) .................... 10-2020-0166018

(51) Int. Cl.
*G01C 21/36* (2006.01)

(52) U.S. Cl.
CPC ....... *G01C 21/3638* (2013.01); *G01C 21/365* (2013.01)

(58) Field of Classification Search
None
See application file for complete search history.

(56) References Cited

U.S. PATENT DOCUMENTS

2014/0152764 A1*  6/2014  Kira ............... G01C 21/3647
                                                      348/36
2015/0022555 A1*  1/2015  Chau ................. G09G 5/377
                                                      345/635

(Continued)

FOREIGN PATENT DOCUMENTS

JP    2008032596    2/2008
JP    2019095213    6/2019

(Continued)

OTHER PUBLICATIONS

PCT International Application No. PCT/KR2021/017831, International Search Report dated Mar. 4, 2022, 5 pages.

(Continued)

*Primary Examiner* — Daniel L Greene
(74) *Attorney, Agent, or Firm* — LEE, HONG, DEGERMAN, KANG & WAIMEY

(57) ABSTRACT

The present invention provides a route guidance device and a route guidance system. The route guidance device according to an embodiment of the present invention comprises: an interface unit which communicates with at least one of components provided in a vehicle; and a processor which generates a digital twin three-dimensional map using at least one among an image captured by a camera provided in the vehicle, two-dimensional map information, and three-dimensional map information, wherein the processor overlays a graphical object related to route guidance on the digital twin three-dimensional map, and performs route guidance using the digital twin three-dimensional map overlaid with the graphical object related to route guidance.

11 Claims, 15 Drawing Sheets

(56) References Cited

U.S. PATENT DOCUMENTS

2017/0286572 A1* 10/2017 Hershey .................... B64F 5/60
2020/0269759 A1    8/2020 Watanabe et al.
2021/0039671 A1*  2/2021 Kim ..................... G06V 20/588

FOREIGN PATENT DOCUMENTS

| KR | 1020060039434 | 5/2006 |
| KR | 1020190087266 | 7/2019 |
| KR | 1020200114348 | 10/2020 |

OTHER PUBLICATIONS

European Patent Office Application Serial No. 21900955.2, Search Report dated Oct. 14, 2024, 11 pages.

* cited by examiner

ROUTE GUIDANCE DEVICE AND ROUTE GUIDANCE SYSTEM

CROSS-REFERENCE TO RELATED APPLICATIONS

This application is the National Stage filing under 35 U.S.C. 371 of International Application No. PCT/KR2021/017831, filed on Nov. 30, 2021, which claims the benefit of earlier filing date and right of priority to Korean Application No. 10-2020-0166018, filed on Dec. 1, 2020, the contents of which are all incorporated by reference herein in their entireties.

TECHNICAL FIELD

The present disclosure relates to a route guidance device and a route guidance system for guiding a route for a vehicle to travel.

BACKGROUND ART

A vehicle refers to means of transporting people or goods by using kinetic energy. Representative examples of vehicles include automobiles and motorcycles.

For safety and convenience of a user who uses a vehicle, various sensors and devices are provided in the vehicle, and functions of the vehicle are diversified.

Functions of a vehicle may be divided into a convenience function for promoting driver's convenience, and a safety function for enhancing safety of the driver and/or pedestrians.

First, the convenience function has a development motive associated with the driver's convenience, such as providing infotainment (information+entertainment) to the vehicle, supporting a partially autonomous driving function, or helping the driver ensuring a field of vision at night or at a blind spot. For example, the convenience functions may include various functions, such as an active cruise control (ACC), a smart parking assist system (SPAS), a night vision (NV), a head up display (HUD), an around view monitor (AVM), an adaptive headlight system (AHS), and the like.

The safety function is a technique of ensuring safeties of the driver and/or pedestrians, and may include various functions, such as a lane departure warning system (LDWS), a lane keeping assist system (LKAS), an autonomous emergency braking (ABE), and the like.

Recently, Augmented Reality (AR) that outputs a graphic object through a windshield of a vehicle or a Head Up Display (HUD) or additionally outputs a graphic object to the real world by outputting the graphic object on an image captured by a camera is being actively developed.

Technologies for guiding a route for a driver driving a vehicle through such an augmented reality technology are being developed.

On the other hand, the related art route guidance technologies using the augmented reality technology have problems such as an inaccurate vehicle position, inaccurate POI (Point Of Interest) coordinates, errors due to height information errors, inaccurate mapping due to real-time vehicle movement, and the like.

DISCLOSURE OF INVENTION

Technical Problem

The present disclosure is directed to solving those problems and other drawbacks.

One aspect of the present disclosure is to provide a route guidance device and a route guidance system capable of performing route guidance in an optimized manner.

Another aspect of the present disclosure is to provide a route guidance device and a route guidance system capable of performing route guidance in an optimized way by integrating an augmented reality technology.

Still another aspect of the present disclosure is to provide a route guidance device and a route guidance system capable of performing route guidance using digital twinning.

Solution to Problem

A route guidance device according to one embodiment of the present disclosure includes an interface unit that communicates with at least one of components disposed in a vehicle, and a processor that generates a digital twin three-dimensional (3D) map using at least one of an image captured by a camera disposed in the vehicle, two-dimensional (2D) map information, and 3D map information, wherein the processor overlays a graphic object related to route guidance on the digital twin 3D map, and performs the route guidance using the digital twin 3D map with the graphic object related to the route guidance overlaid thereon.

In an embodiment disclosed herein, the processor generates the digital twin 3D map by mapping the image captured by the camera to the 3D map information.

In an embodiment disclosed herein, the processor determines a position where the image captured by the camera is mapped to the 3D map information, using the 2D map information.

In an embodiment disclosed herein, the processor deletes a 3D block corresponding to an object, which does not exist in reality, from the 3D map information or adds a 3D block corresponding to an object existing in reality, based on the 2D map information and the 3D map information.

In an embodiment disclosed herein, the processor creates the digital twin 3D map and overlays a graphic object related to route guidance on the digital twin 3D map when a preset condition is satisfied.

In an embodiment disclosed herein, the preset condition includes at least one of a case corresponding to a specific weather condition and a case where another object exists, instead of an object on which the graphic object related to route guidance is to be overlaid.

A route guidance system according to one embodiment of the present disclosure a server that transmits three-dimensional (3D) map information, and a route guidance device that senses vehicle-related information from a sensor disposed in the vehicle and generates a digital twin 3D map by matching the sensed vehicle-related information with the 3D map information received from the server, wherein the route guidance device overlaps a graphic object related to route guidance on the digital twin 3D map, and performs the route guidance using the digital twin 3D map with the graphic object related to the route guidance overlaid thereon.

In an embodiment disclosed herein, the route guidance device includes a camera disposed in the vehicle to capture an image, and an augmented reality (AR) engine that generates the digital twin 3D map by mapping the image captured by the camera to the 3D map information.

In an embodiment disclosed herein, the AR engine determines a position where the image captured by the camera is mapped to the 3D map information, using 2D map information.

In an embodiment disclosed herein, the route guidance device transmits an image obtained through a camera disposed in the vehicle to the server, and the server generates a digital twin 3D map by mapping the received image to the 3D map information, and transmits the generated 3D map to the route guidance device.

In an embodiment disclosed herein, the route guidance device overlays a graphic object related to route guidance on the digital twin 3D map received from the server.

In an embodiment disclosed herein, the route guidance device determines a position where the graphic object related to route guidance is to be mapped on the digital twin 3D map, using 2D map information.

In an embodiment disclosed herein, the route guidance device transmits vehicle-related information obtained from the vehicle to the server, and the server generates a digital twin 3D map based on the vehicle-related information received from the route guidance device.

In an embodiment disclosed herein, the route guidance device determines whether a preset condition that requires for route guidance through the digital twin 3D map is satisfied, based on the image obtained through the camera. The route guidance device then transmits the image to the server and receives the digital twin 3D map from the server when the preset condition is satisfied.

In an embodiment disclosed herein, the preset condition includes a case where there is a graphic object which has to be exposed at a place where the vehicle is to be located after a predetermined time elapses based on 2D map information.

Advantageous Effects of Invention

Hereinafter, effects of a route guidance device and a route guidance system according to the present disclosure will be described.

First, the present disclosure may provide a new route guidance interface capable of implementing augmented reality using a digital twin 3D map.

Second, the present disclosure may overcome various problems that occur when augmented reality is implemented on a real-world image or a real-world space by overlaying a graphic object implemented in augmented reality on a digital twin 3D map.

Third, the present disclosure may provide a new AR navigation service that can provide a route guidance service in augmented reality through a digital twin 3D map in collaboration with a server and a vehicle.

MODE FOR THE INVENTION

Description will now be given in detail according to one or more embodiments disclosed herein, with reference to the accompanying drawings. For the sake of brief description with reference to the drawings, the same or equivalent components may be provided with the same or similar reference numbers, and description thereof will not be repeated. In general, a suffix such as "module" and "unit" may be used to refer to elements or components. Use of such a suffix herein is merely intended to facilitate description of the specification, and the suffix itself is not intended to give any special meaning or function. In describing the present disclosure, if a detailed explanation for a related known function or construction is considered to unnecessarily divert the gist of the present disclosure, such explanation has been omitted but would be understood by those skilled in the art. The accompanying drawings are used to help easily understand the technical idea of the present disclosure and it should be understood that the idea of the present disclosure is not limited by the accompanying drawings. The idea of the present disclosure should be construed to extend to any alterations, equivalents and substitutes besides the accompanying drawings.

It will be understood that although the terms first, second, etc. may be used herein to describe various elements, these elements should not be limited by these terms. These terms are generally only used to distinguish one element from another.

It will be understood that when an element is referred to as being "connected with" another element, the element can be connected with the another element or intervening elements may also be present. In contrast, when an element is referred to as being "directly connected with" another element, there are no intervening elements present.

A singular representation may include a plural representation unless it represents a definitely different meaning from the context.

Terms such as "include" or "has" are used herein and should be understood that they are intended to indicate an existence of several components, functions or steps, disclosed in the specification, and it is also understood that greater or fewer components, functions, or steps may likewise be utilized.

A vehicle according to an embodiment of the present disclosure may be understood as a conception including cars, motorcycles and the like. Hereinafter, the vehicle will be described based on a car.

The vehicle according to the embodiment of the present disclosure may be a conception including all of an internal combustion engine car having an engine as a power source, a hybrid vehicle having an engine and an electric motor as power sources, an electric vehicle having an electric motor as a power source, and the like.

In the following description, a left side of a vehicle refers to a left side in a driving direction of the vehicle, and a right side of the vehicle refers to a right side in the driving direction.

Figure 1:
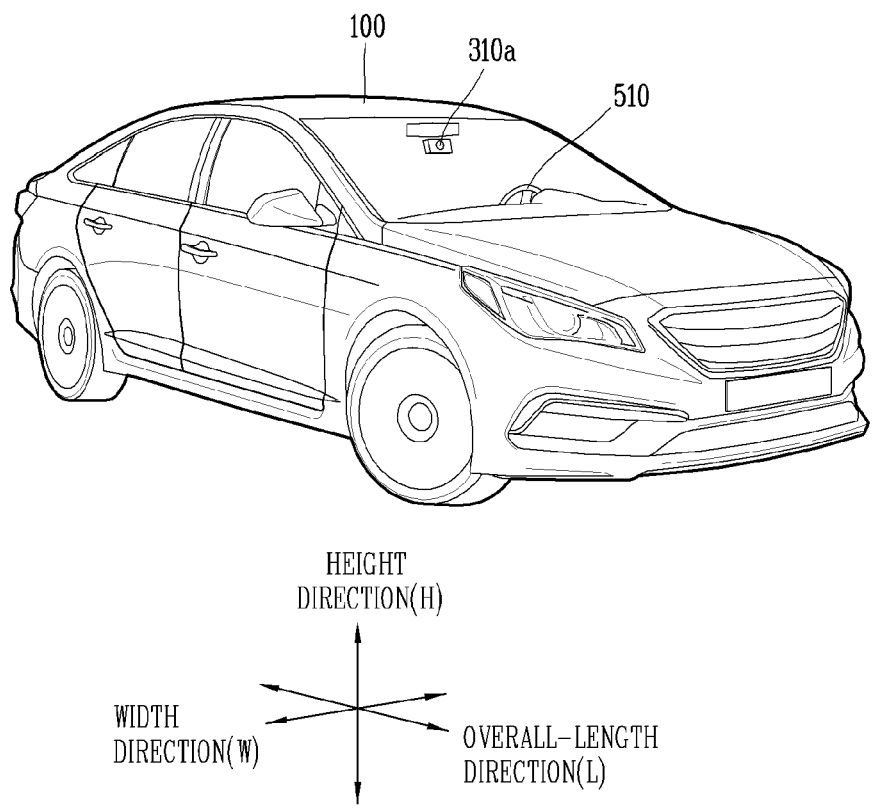
FIG. 1 is a view illustrating appearance of a vehicle in accordance with an embodiment of the present disclosure.

FIG. 1 is a view illustrating appearance of a vehicle in accordance with an embodiment of the present disclosure.

Figure 2:
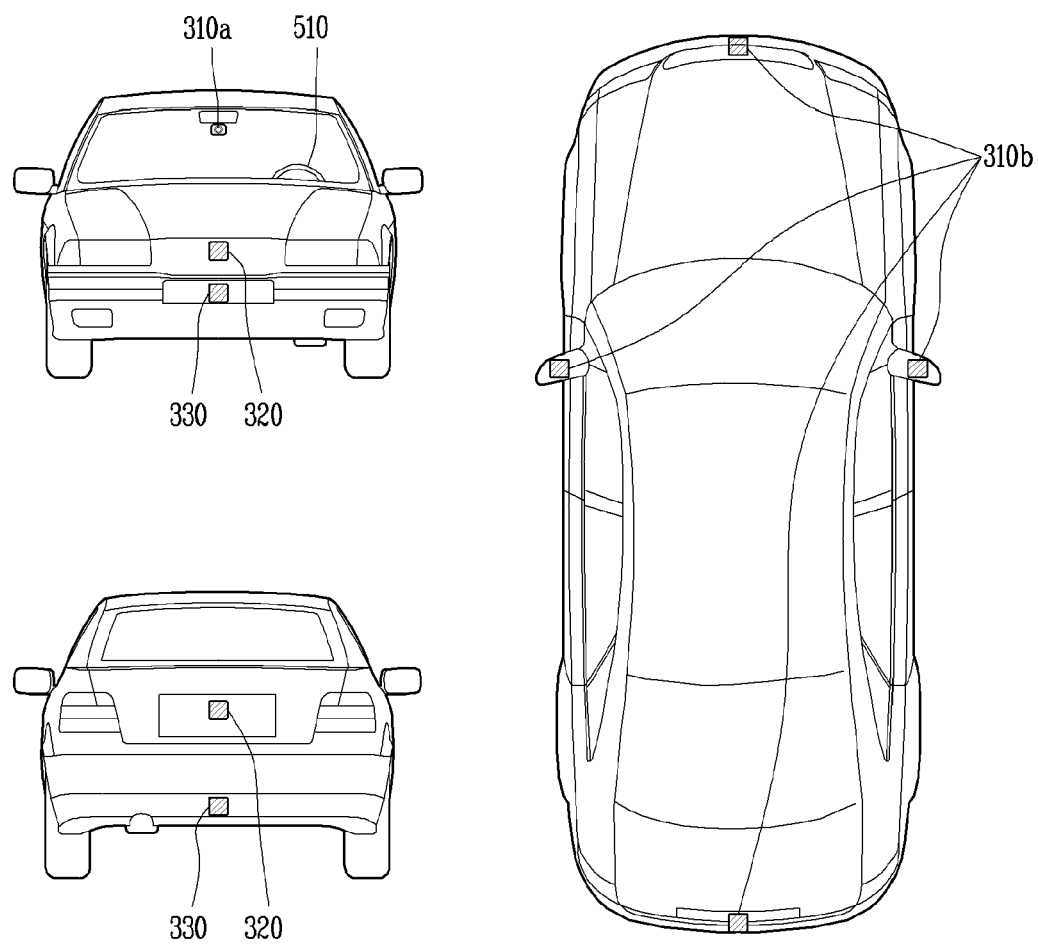
FIG. 2 is a diagram illustrating appearance of a vehicle at various angles in accordance with an embodiment of the present disclosure.

FIG. 2 is a diagram illustrating appearance of a vehicle at various angles in accordance with an embodiment of the present disclosure.

Figure 3:
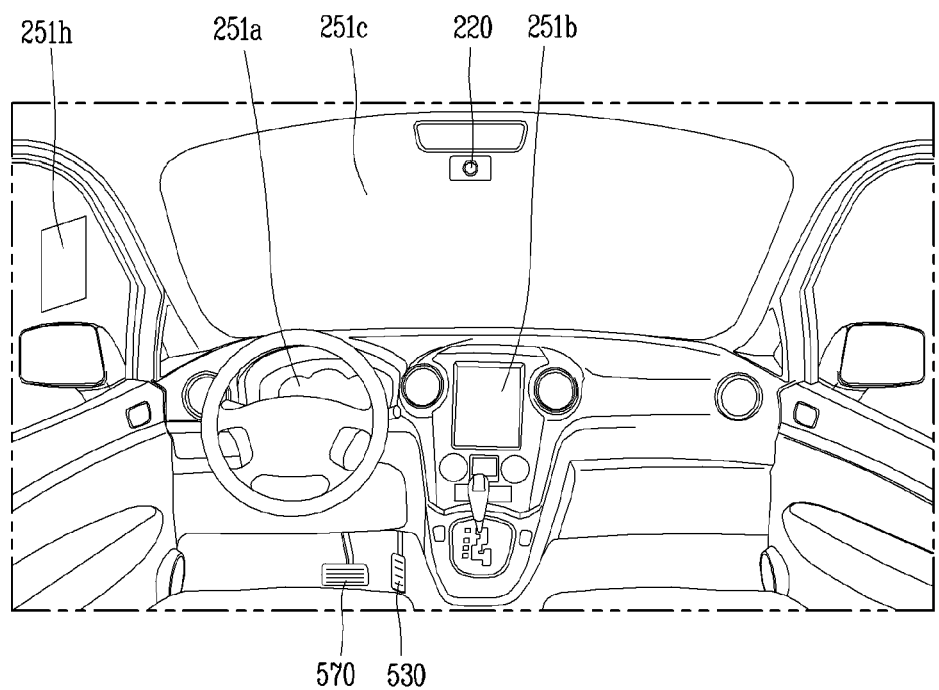
FIGS. 3 and 4 are diagrams illustrating an inside of a vehicle in accordance with an embodiment of the present disclosure.
Figure 4:
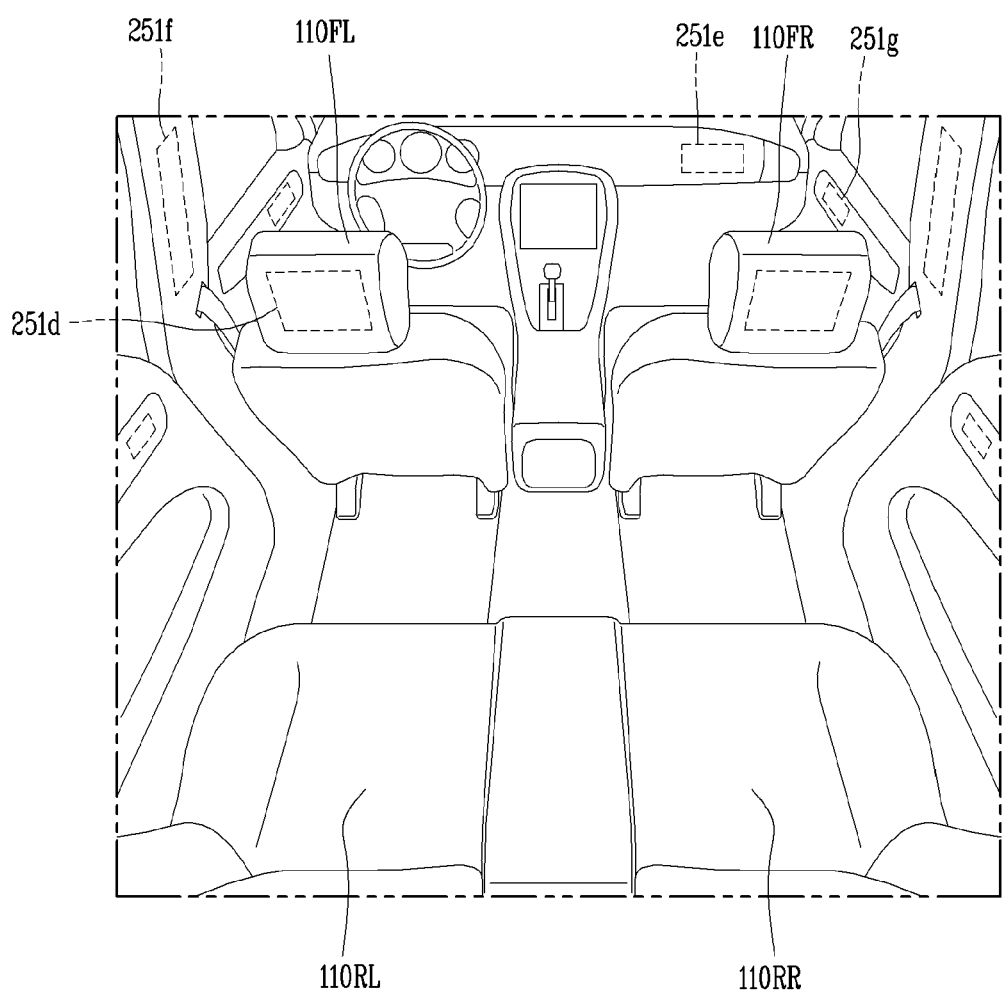

FIGS. 3 and 4 are diagrams illustrating an inside of a vehicle in accordance with an embodiment of the present disclosure.

Figure 5:
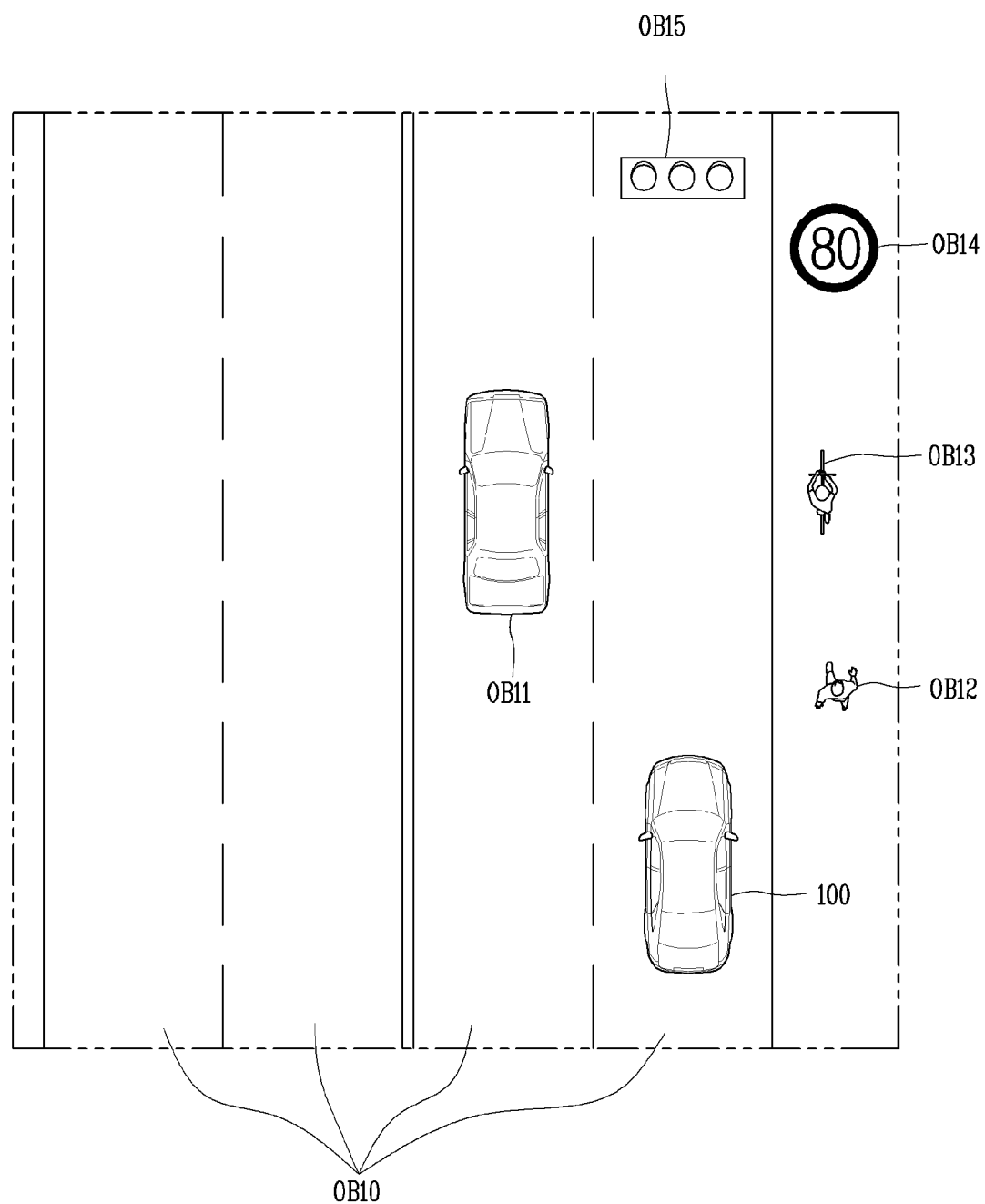
FIGS. 5 and 6 are diagrams illustrating objects in accordance with an embodiment of the present disclosure.
Figure 6:
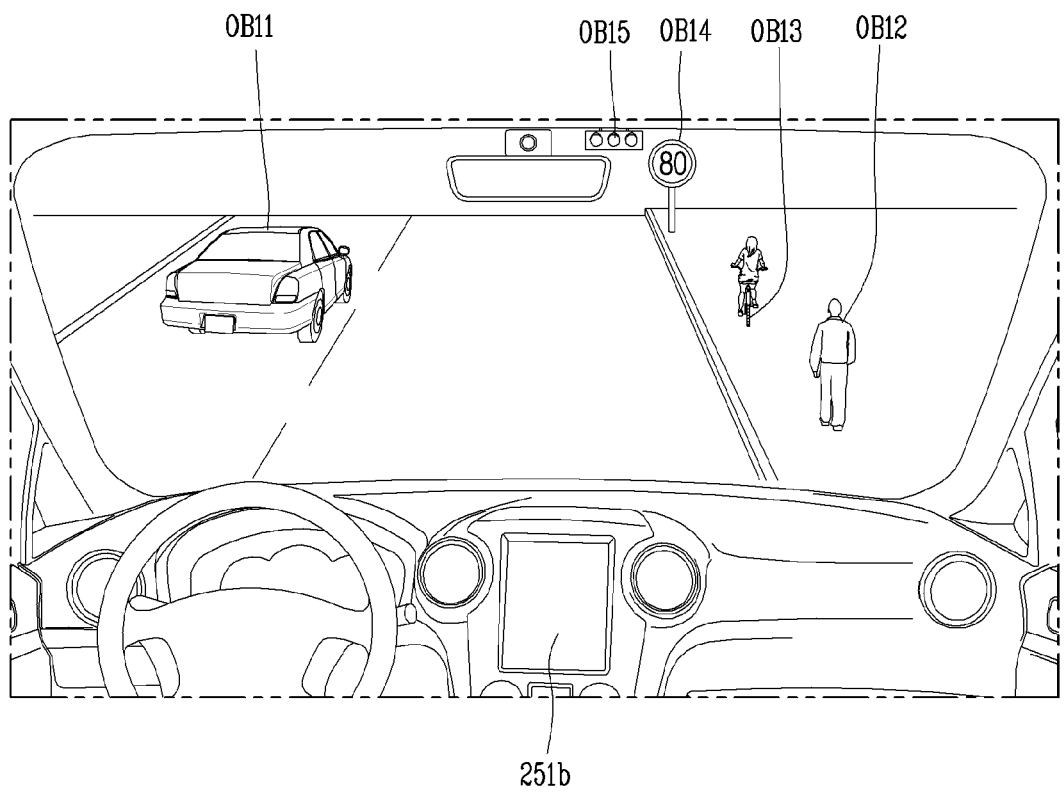

FIGS. 5 and 6 are diagrams illustrating objects in accordance with an embodiment of the present disclosure.

Figure 7:
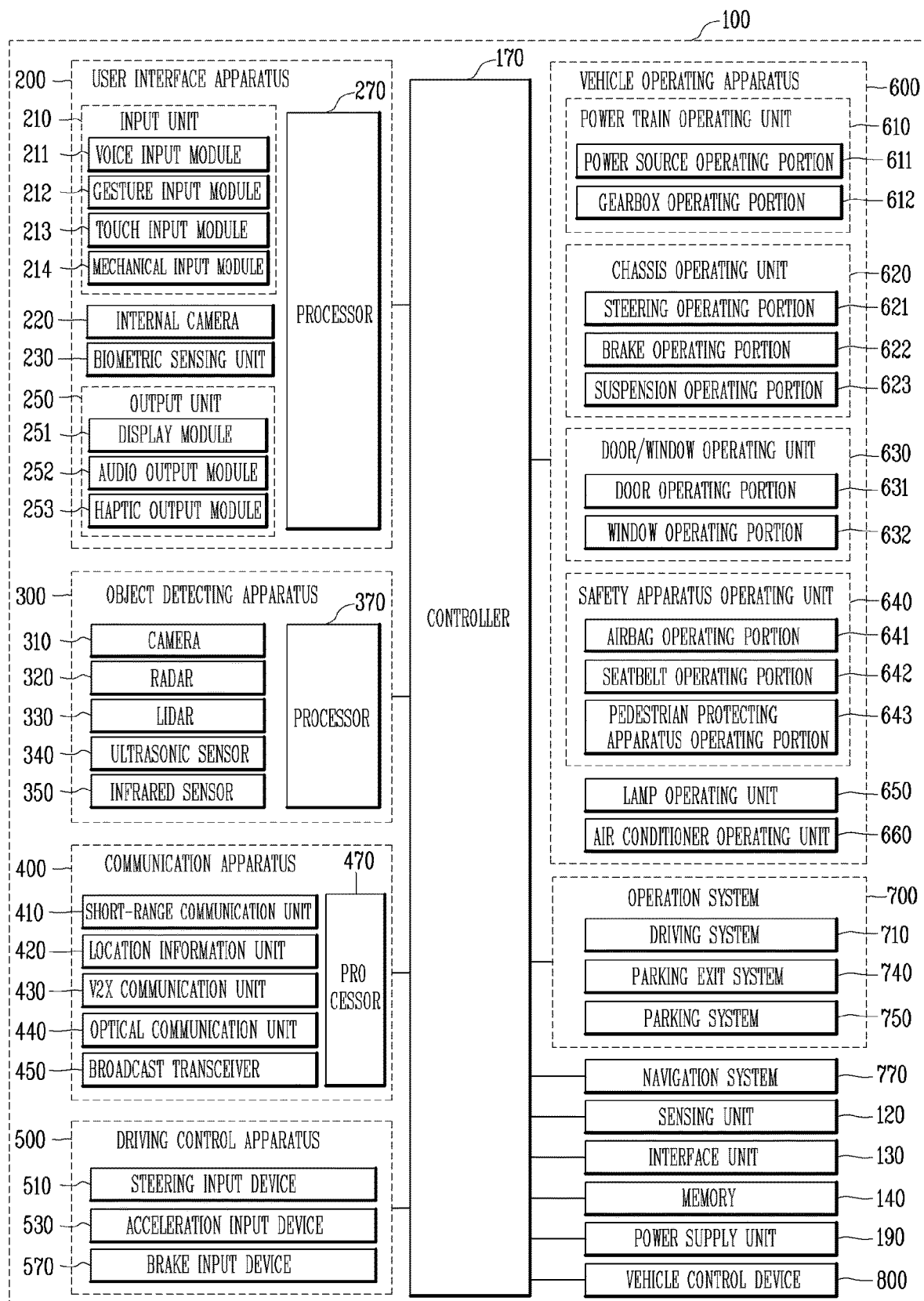
FIG. 7 is a block diagram illustrating a vehicle in accordance with an embodiment of the present disclosure.

FIG. 7 is a block diagram illustrating a vehicle in accordance with an embodiment of the present disclosure.

As illustrated in FIG. 1 to 7, a vehicle 100 may include wheels turning by a driving force, and a steering apparatus 510 for adjusting a driving (ongoing, moving) direction of the vehicle 100.

The vehicle 100 may be an autonomous vehicle.

The vehicle 100 may be switched into an autonomous mode or a manual mode based on a user input.

For example, the vehicle may be converted from the manual mode into the autonomous mode or from the autonomous mode into the manual mode based on a user input received through a user interface apparatus 200.

The vehicle 100 may be switched into the autonomous mode or the manual mode based on driving environment information. The driving environment information may be generated based on object information provided from an object detecting apparatus 300.

For example, the vehicle 100 may be switched from the manual mode into the autonomous mode or from the autonomous mode into the manual mode based on driving environment information generated in the object detecting apparatus 300.

In an example, the vehicle 100 may be switched from the manual mode into the autonomous mode or from the autonomous mode into the manual mode based on driving environment information received through a communication apparatus 400.

The vehicle 100 may be switched from the manual mode into the autonomous mode or from the autonomous mode into the manual mode based on information, data or signal provided from an external device.

When the vehicle 100 is driven in the autonomous mode, the autonomous vehicle 100 may be driven based on an operation system 700.

For example, the autonomous vehicle 100 may be driven based on information, data or signals generated in a driving system 710, a parking exit system 740 and a parking system 750.

When the vehicle 100 is driven in the manual mode, the vehicle 100 may receive a user input for driving through a driving control apparatus 500. The vehicle 100 may be driven based on the user input received through the driving control apparatus 500.

An overall length refers to a length from a front end to a rear end of the vehicle 100, a width refers to a width of the vehicle 100, and a height refers to a length from a bottom of a wheel to a roof. In the following description, an overall-length direction L may refer to a direction which is a criterion for measuring the overall length of the vehicle 100, a width direction W may refer to a direction that is a criterion for measuring a width of the vehicle 100, and a height direction H may refer to a direction that is a criterion for measuring a height of the vehicle 100.

As illustrated in FIG. 7, the vehicle 100 may include a user interface apparatus 200, an object detecting apparatus 300, a communication apparatus 400, a driving control apparatus 500, a vehicle operating apparatus 600, an operation system 700, a navigation system 770, a sensing unit 120, an interface unit 130, a memory 140, a controller 170 and a power supply unit 190.

According to embodiments, the vehicle 100 may include more components in addition to components to be explained in this specification or may not include some of those components to be explained in this specification.

The user interface apparatus 200 is an apparatus for communication between the vehicle 100 and a user. The user interface apparatus 200 may receive a user input and provide information generated in the vehicle 100 to the user. The vehicle 100 may implement user interfaces (UIs) or user experiences (UXs) through the user interface apparatus 200.

The user interface apparatus 200 may include an input unit 210, an internal camera 220, a biometric sensing unit 230, an output unit 250 and at least one processor, such as processor 270.

According to embodiments, the user interface apparatus 200 may include more components in addition to components to be explained in this specification or may not include some of those components to be explained in this specification.

The input unit 200 may allow the user to input information. Data collected in the input unit 120 may be analyzed by the processor 270 and processed as a user's control command.

The input unit 200 may be disposed inside the vehicle. For example, the input unit 200 may be disposed on one region of a steering wheel, one region of an instrument panel, one region of a seat, one region of each pillar, one region of a door, one region of a center console, one region of a headlining, one region of a sun visor, one region of a windshield, one region of a window, or the like.

The input unit 200 may include a voice input module 211, a gesture input module 212, a touch input module 213, and a mechanical input module 214.

The audio input module 211 may convert a user's voice input into an electric signal. The converted electric signal may be provided to the processor 270 or the controller 170.

The audio input module 211 may include at least one microphone.

The gesture input module 212 may convert a user's gesture input into an electric signal. The converted electric signal may be provided to the processor 270 or the controller 170.

The gesture input module 212 may include at least one of an infrared sensor and an image sensor for detecting the user's gesture input.

According to embodiments, the gesture input module 212 may detect a user's three-dimensional (3D) gesture input. To this end, the gesture input module 212 may include a light emitting diode outputting a plurality of infrared rays or a plurality of image sensors.

The gesture input module 212 may detect the user's 3D gesture input by a time of flight (TOF) method, a structured light method or a disparity method.

The touch input module 213 may convert the user's touch input into an electric signal. The converted electric signal may be provided to the processor 270 or the controller 170.

The touch input module 213 may include a touch sensor for detecting the user's touch input.

According to an embodiment, the touch input module 213 may be integrated with the display module 251 so as to implement a touch screen. The touch screen may provide an input interface and an output interface between the vehicle 100 and the user.

The mechanical input module 214 may include at least one of a button, a dome switch, a jog wheel and a jog switch.

An electric signal generated by the mechanical input module 214 may be provided to the processor 270 or the controller 170.

The mechanical input module 214 may be arranged on a steering wheel, a center fascia, a center console, a cockpit module, a door and the like.

The internal camera 220 may acquire an internal image of the vehicle. The processor 270 may detect a user's state based on the internal image of the vehicle. The processor 270 may acquire information related to the user's gaze from the internal image of the vehicle. The processor 270 may detect a user gesture from the internal image of the vehicle.

The biometric sensing unit 230 may acquire the user's biometric information. The biometric sensing unit 230 may include a sensor for detecting the user's biometric information and acquire fingerprint information and heart rate information regarding the user using the sensor. The biometric information may be used for user authentication.

The output unit 250 may generate an output related to a visual, audible or tactile signal.

The output unit 250 may include at least one of a display module 251, an audio output module 252 and a haptic output module 253.

The display module 251 may output graphic objects corresponding to various types of information.

The display module 251 may include at least one of a liquid crystal display (LCD), a thin film transistor-LCD (TFT LCD), an organic light-emitting diode (OLED), a flexible display, a three-dimensional (3D) display and an e-ink display.

The display module 251 may be inter-layered or integrated with a touch input module 213 to implement a touch screen.

The display module 251 may be implemented as a head up display (HUD). When the display module 251 is implemented as the HUD, the display module 251 may be provided with a projecting module so as to output information through an image which is projected on a windshield or a window.

The display module 251 may include a transparent display. The transparent display may be attached to the windshield or the window.

The transparent display may have a predetermined degree of transparency and output a predetermined screen thereon. The transparent display may include at least one of a thin film electroluminescent (TFEL), a transparent OLED, a transparent LCD, a transmissive transparent display, and a transparent LED display. The transparent display may have adjustable transparency.

Meanwhile, the user interface apparatus 200 may include a plurality of display modules 251a to 251g.

The display module 251 may be disposed on one area of a steering wheel, one area 521a, 251b, 251e of an instrument panel, one area 251d of a seat, one area 251f of each pillar, one area 251g of a door, one area of a center console, one area of a headlining or one area of a sun visor, or implemented on one area 251c of a windshield or one area 251h of a window.

The audio output module 252 converts an electric signal provided from the processor 270 or the controller 170 into an audio signal for output. To this end, the audio output module 252 may include at least one speaker.

The haptic output module 253 generates a tactile output. For example, the haptic output module 253 may vibrate the steering wheel, a safety belt, a seat 110FL, 110FR, 110RL, 110RR such that the user may recognize such output.

The processor 270 may control an overall operation of each unit of the user interface apparatus 200.

According to an embodiment, the user interface apparatus 200 may include a plurality of processors 270 or may not include any processor 270.

When the processor 270 is not included in the user interface apparatus 200, the user interface apparatus 200 may operate according to a control of a processor of another apparatus within the vehicle 100 or the controller 170.

In some examples, the user interface apparatus 200 may be called as a display device for vehicle.

The user interface apparatus 200 may operate according to the control of the controller 170.

The object detecting apparatus 300 is an apparatus for detecting an object located at outside of the vehicle 100.

The object may be a variety of objects associated with driving (operation) of the vehicle 100.

Referring to FIGS. 5 and 6, an object O may include a traffic lane OB10, another vehicle OB11, a pedestrian OB12, a two-wheeled vehicle OB13, traffic signals OB14 and OB15, light, a road, a structure, a speed hump, a terrain, an animal and the like.

The lane OB10 may be a driving lane, a lane next to the driving lane or a lane on which another vehicle comes in an opposite direction to the vehicle 100. The lanes OB10 may include left and right lines forming a lane.

The another vehicle OB11 may be a vehicle which is moving around the vehicle 100. The another vehicle OB11 may be a vehicle located within a predetermined distance from the vehicle 100. For example, the another vehicle OB11 may be a vehicle which moves before or after the vehicle 100.

The pedestrian OB12 may be a person located near the vehicle 100. The pedestrian OB12 may be a person located within a predetermined distance from the vehicle 100. For example, the pedestrian OB12 may be a person located on a sidewalk or roadway.

The two-wheeled vehicle OB12 may refer to a vehicle (transportation facility) that is located near the vehicle 100 and moves using two wheels. The two-wheeled vehicle OB12 may be a vehicle that is located within a predetermined distance from the vehicle 100 and has two wheels. For example, the two-wheeled vehicle OB13 may be a motorcycle or a bicycle that is located on a sidewalk or roadway.

The traffic signals may include a traffic light OB15, a traffic sign OB14 and a pattern or text drawn on a road surface.

The light may be light emitted from a lamp provided on another vehicle. The light may be light generated from a streetlamp. The light may be solar light.

The road may include a road surface, a curve, an upward slope, a downward slope and the like.

The structure may be an object that is located near a road and fixed on the ground. For example, the structure may include a streetlamp, a roadside tree, a building, an electric pole, a traffic light, a bridge and the like.

The terrain may include a mountain, a hill, and the like.

Meanwhile, objects may be classified into a moving object and a fixed object. For example, the moving object may be a concept including another vehicle and a pedestrian. The fixed object may be a concept including a traffic signal, a road and a structure, for example.

The object detecting apparatus 300 may include a camera 310, a radar 320, a LiDAR 330, an ultrasonic sensor 340, an infrared sensor 350, and a processor 370.

According to an embodiment, the object detecting apparatus 300 may further include other components in addition to the components described, or may not include some of the components described.

The camera 310 may be located on an appropriate portion outside the vehicle to acquire an external image of the vehicle. The camera 310 may be a mono camera, a stereo camera 310a, an around view monitoring (AVM) camera 310b or a 360-degree camera.

For example, the camera 310 may be disposed adjacent to a front windshield within the vehicle to acquire a front image of the vehicle. Or, the camera 310 may be disposed adjacent to a front bumper or a radiator grill.

For example, the camera 310 may be disposed adjacent to a rear glass within the vehicle to acquire a rear image of the vehicle. Or, the camera 310 may be disposed adjacent to a rear bumper, a trunk or a tail gate.

For example, the camera 310 may be disposed adjacent to at least one of side windows within the vehicle to acquire a side image of the vehicle. Or, the camera 310 may be disposed adjacent to a side mirror, a fender or a door.

The camera 310 may provide an acquired image to the processor 370.

The radar 320 may include electric wave transmitting and receiving portions. The radar 320 may be implemented as a pulse radar or a continuous wave radar according to a principle of emitting electric waves. The radar 320 may be implemented in a frequency modulated continuous wave (FMCW) manner or a frequency shift Keyong (FSK) manner according to a signal waveform, among the continuous wave radar methods.

The radar 320 may detect an object in a time of flight (TOF) manner or a phase-shift manner through the medium of the electric wave, and detect a position of the detected object, a distance from the detected object and a relative speed with the detected object.

The radar 320 may be disposed on an appropriate position outside the vehicle for detecting an object which is located at a front, rear or side of the vehicle.

The LiDAR 330 may include laser transmitting and receiving portions. The LiDAR 330 may be implemented in a time of flight (TOF) manner or a phase-shift manner.

The LiDAR 330 may be implemented as a drive type or a non-drive type.

For the drive type, the LiDAR 330 may be rotated by a motor and detect object near the vehicle 100.

For the non-drive type, the LiDAR 330 may detect, through light steering, objects which are located within a predetermined range based on the vehicle 100. The vehicle 100 may include a plurality of non-drive type LiDARs 330.

The LiDAR 330 may detect an object in a TOP manner or a phase-shift manner through the medium of a laser beam, and detect a position of the detected object, a distance from the detected object and a relative speed with the detected object.

The LiDAR 330 may be disposed on an appropriate position outside the vehicle for detecting an object located at the front, rear or side of the vehicle.

The ultrasonic sensor 340 may include ultrasonic wave transmitting and receiving portions. The ultrasonic sensor 340 may detect an object based on an ultrasonic wave, and detect a position of the detected object, a distance from the detected object and a relative speed with the detected object.

The ultrasonic sensor 340 may be disposed on an appropriate position outside the vehicle for detecting an object located at the front, rear or side of the vehicle.

The infrared sensor 350 may include infrared light transmitting and receiving portions. The infrared sensor 340 may detect an object based on infrared light, and detect a position of the detected object, a distance from the detected object and a relative speed with the detected object.

The infrared sensor 350 may be disposed on an appropriate position outside the vehicle for detecting an object located at the front, rear or side of the vehicle.

The processor 370 may control an overall operation of each unit of the object detecting apparatus 300.

The processor 370 may detect an object based on an acquired image, and track the object. The processor 370 may execute operations, such as a calculation of a distance from the object, a calculation of a relative speed with the object and the like, through an image processing algorithm.

The processor 370 may detect an object based on a reflected electromagnetic wave which an emitted electromagnetic wave is reflected from the object, and track the object. The processor 370 may execute operations, such as a calculation of a distance from the object, a calculation of a relative speed with the object and the like, based on the electromagnetic wave.

The processor 370 may detect an object based on a reflected laser beam which an emitted laser beam is reflected from the object, and track the object. The processor 370 may execute operations, such as a calculation of a distance from the object, a calculation of a relative speed with the object and the like, based on the laser beam.

The processor 370 may detect an object based on a reflected ultrasonic wave which an emitted ultrasonic wave is reflected from the object, and track the object. The processor 370 may execute operations, such as a calculation of a distance from the object, a calculation of a relative speed with the object and the like, based on the ultrasonic wave.

The processor 370 may detect an object based on reflected infrared light which emitted infrared light is reflected from the object, and track the object. The processor 370 may execute operations, such as a calculation of a distance from the object, a calculation of a relative speed with the object and the like, based on the infrared light.

According to an embodiment, the object detecting apparatus 300 may include a plurality of processors 370 or may not include any processor 370. For example, each of the camera 310, the radar 320, the LiDAR 330, the ultrasonic sensor 340 and the infrared sensor 350 may include the processor in an individual manner.

When the processor 370 is not included in the object detecting apparatus 300, the object detecting apparatus 300 may operate according to the control of a processor of an apparatus within the vehicle 100 or the controller 170.

The object detecting apparatus 400 may operate according to the control of the controller 170.

The communication apparatus 400 is an apparatus for performing communication with an external device. Here, the external device may be another vehicle, a mobile terminal or a server.

The communication apparatus 400 may perform the communication by including at least one of a transmitting antenna, a receiving antenna, and radio frequency (RF) circuit and RF device for implementing various communication protocols.

The communication apparatus 400 may include a short-range communication unit 410, a location information unit 420, a V2X communication unit 430, an optical communication unit 440, a broadcast transceiver 450 and a processor 470.

According to an embodiment, the communication apparatus 400 may further include other components in addition to the components described, or may not include some of the components described.

The short-range communication unit 410 is a unit for facilitating short-range communications. Suitable technologies for implementing such short-range communications may include Bluetooth™, Radio Frequency IDentification (RFID), Infrared Data Association (IrDA), Ultra-WideBand (UWB), ZigBee, Near Field Communication (NFC), Wireless-Fidelity (Wi-Fi), Wi-Fi Direct, Wireless USB (Wireless Universal Serial Bus), and the like.

The short-range communication unit 410 may construct short-range area networks to perform short-range communication between the vehicle 100 and at least one external device.

The location information unit 420 is a unit for acquiring position information. For example, the location information unit 420 may include a Global Positioning System (GPS) module or a Differential Global Positioning System (DGPS) module.

The V2X communication unit 430 is a unit for performing wireless communications with a server (Vehicle to Infra; V2I), another vehicle (Vehicle to Vehicle; V2V), or a pedestrian (Vehicle to Pedestrian; V2P). The V2X communication unit 430 may include an RF circuit implementing a communication protocol with the infra (V2I), a communication protocol between the vehicles (V2V) and a communication protocol with a pedestrian (V2P).

The optical communication unit 440 is a unit for performing communication with an external device through the medium of light. The optical communication unit 440 may include a light-emitting diode for converting an electric signal into an optical signal and sending the optical signal to the exterior, and a photodiode for converting the received optical signal into an electric signal.

According to an embodiment, the light-emitting diode may be integrated with lamps provided on the vehicle 100.

The broadcast transceiver 450 is a unit for receiving a broadcast signal from an external broadcast managing entity or transmitting a broadcast signal to the broadcast managing entity via a broadcast channel. The broadcast channel may include a satellite channel, a terrestrial channel, or both. The broadcast signal may include a TV broadcast signal, a radio broadcast signal, and a data broadcast signal.

The processor 470 may control an overall operation of each unit of the communication apparatus 400.

According to an embodiment, the communication apparatus 400 may include a plurality of processors 470 or may not include any processor 470.

When the processor 470 is not included in the communication apparatus 400, the communication apparatus 400 may operate according to the control of a processor of another device within the vehicle 100 or the controller 170.

Meanwhile, the communication apparatus 400 may implement a display apparatus for a vehicle together with the user interface apparatus 200. In this instance, the display device for the vehicle may be referred to as a telematics apparatus or an Audio Video Navigation (AVN) apparatus.

The communication apparatus 400 may operate according to the control of the controller 170.

The driving control apparatus 500 is an apparatus for receiving a user input for driving.

In a manual mode, the vehicle 100 may be operated based on a signal provided by the driving control apparatus 500.

The driving control apparatus 500 may include a steering input device 510, an acceleration input device 530 and a brake input device 570.

The steering input device 510 may receive an input regarding a driving (ongoing) direction of the vehicle 100 from the user. The steering input device 510 is preferably configured in the form of a wheel allowing a steering input in a rotating manner. According to some embodiments, the steering input device may also be configured in a shape of a touch screen, a touch pad or a button.

The acceleration input device 530 may receive an input for accelerating the vehicle 100 from the user. The brake input device 570 may receive an input for braking the vehicle 100 from the user. Each of the acceleration input device 530 and the brake input device 570 is preferably configured in the form of a pedal. According to some embodiments, the acceleration input device or the brake input device may also be configured in a shape of a touch screen, a touch pad or a button.

The driving control apparatus 500 may operate according to the control of the controller 170.

The vehicle operating apparatus 600 is an apparatus for electrically controlling operations of various devices within the vehicle 100.

The vehicle operating apparatus 600 may include a power train operating unit 610, a chassis operating unit 620, a door/window operating unit 630, a safety apparatus operating unit 640, a lamp operating unit 650, and an air-conditioner operating unit 660.

According to an embodiment, the vehicle operating apparatus 600 may further include other components in addition to the components described, or may not include some of the components described.

In some examples, the vehicle operating apparatus 600 may include a processor. Each unit of the vehicle operating apparatus 600 may individually include a processor.

The power train operating unit 610 may control an operation of a power train device.

The power train operating unit 610 may include a power source operating portion 611 and a gearbox operating portion 612.

The power source operating portion 611 may perform a control for a power source of the vehicle 100.

For example, upon using a fossil fuel-based engine as the power source, the power source operating portion 611 may perform an electronic control for the engine. Accordingly, an output torque and the like of the engine may be controlled. The power source operating portion 611 may adjust the engine output torque according to the control of the controller 170.

For example, upon using an electric energy-based motor as the power source, the power source operating portion 611 may perform a control for the motor. The power source operating portion 611 may adjust a rotating speed, a torque and the like of the motor according to the control of the controller 170.

The gearbox operating portion 612 may perform a control for a gearbox.

The gearbox operating portion 612 may adjust a state of the gearbox. The gearbox operating portion 612 may change the state of the gearbox into drive (forward) (D), reverse (R), neutral (N) or parking (P).

Meanwhile, when an engine is the power source, the gearbox operating portion 612 may adjust a locked state of a gear in the drive (D) state.

The chassis operating unit 620 may control an operation of a chassis device.

The chassis operating unit 620 may include a steering operating portion 621, a brake operating portion 622 and a suspension operating portion 623.

The steering operating portion 621 may perform an electronic control for a steering apparatus within the vehicle 100. The steering operating portion 621 may change a driving direction of the vehicle.

The brake operating portion 622 may perform an electronic control for a brake apparatus within the vehicle 100. For example, the brake operating portion 622 may control an operation of brakes provided at wheels to reduce speed of the vehicle 100.

Meanwhile, the brake operating portion 622 may individually control each of a plurality of brakes. The brake operating portion 622 may differently control braking force applied to each of a plurality of wheels.

The suspension operating portion 623 may perform an electronic control for a suspension apparatus within the vehicle 100. For example, the suspension operating portion 623 may control the suspension apparatus to reduce vibration of the vehicle 100 when a bump is present on a road.

Meanwhile, the suspension operating portion 623 may individually control each of a plurality of suspensions.

The door/window operating unit 630 may perform an electronic control for a door apparatus or a window apparatus within the vehicle 100.

The door/window operating unit 630 may include a door operating portion 631 and a window operating portion 632.

The door operating portion 631 may perform the control for the door apparatus. The door operating portion 631 may control opening or closing of a plurality of doors of the vehicle 100. The door operating portion 631 may control opening or closing of a trunk or a tail gate. The door operating portion 631 may control opening or closing of a sunroof.

The window operating portion 632 may perform the electronic control for the window apparatus. The window operating portion 632 may control opening or closing of a plurality of windows of the vehicle 100.

The safety apparatus operating unit 640 may perform an electronic control for various safety apparatuses within the vehicle 100.

The safety apparatus operating unit 640 may include an airbag operating portion 641, a seatbelt operating portion 642 and a pedestrian protecting apparatus operating portion 643.

The airbag operating portion 641 may perform an electronic control for an airbag apparatus within the vehicle 100. For example, the airbag operating portion 641 may control the airbag to be deployed upon a detection of a risk.

The seatbelt operating portion 642 may perform an electronic control for a seatbelt apparatus within the vehicle 100. For example, the seatbelt operating portion 642 may control passengers to be motionlessly seated in seats 110FL, 110FR, 110RL, 110RR using seatbelts upon a detection of a risk.

The pedestrian protection apparatus operating portion 643 may perform an electronic control for a hood lift and a pedestrian airbag. For example, the pedestrian protection apparatus operating portion 643 may control the hood lift and the pedestrian airbag to be open up upon detecting pedestrian collision.

The lamp operating unit 650 may perform an electronic control for various lamp apparatuses within the vehicle 100.

The air-conditioner operating unit 660 may perform an electronic control for an air conditioner within the vehicle 100. For example, the air-conditioner operating unit 660 may control the air conditioner to supply cold air into the vehicle when internal temperature of the vehicle is high.

The vehicle operating apparatus 600 may include a processor. Each unit of the vehicle operating apparatus 600 may individually include a processor.

The vehicle operating apparatus 600 may operate according to the control of the controller 170.

The operation system 700 is a system that controls various driving modes of the vehicle 100. The operation system 700 may operate in an autonomous driving mode.

The operation system 700 may include a driving system 710, a parking exit system 740 and a parking system 750.

According to an embodiment, the communication apparatus 700 may further include other components in addition to the components described, or may not include some of the components described.

In some examples, the operation system 700 may include at least one processor. Each unit of the operation system 700 may individually include at least one processor.

According to embodiments, the operation system may be a sub concept of the controller 170 when it is implemented in a software configuration.

Meanwhile, according to embodiment, the operation system 700 may be a concept including at least one of the user interface apparatus 200, the object detecting apparatus 300, the communication apparatus 400, the vehicle operating apparatus 600 and the controller 170.

The driving system 710 may perform driving of the vehicle 100.

The driving system 710 may receive navigation information from a navigation system 770, transmit a control signal to the vehicle operating apparatus 600, and perform driving of the vehicle 100.

The driving system 710 may receive object information from the object detecting apparatus 300, transmit a control signal to the vehicle operating apparatus 600 and perform driving of the vehicle 100.

The driving system 710 may receive a signal from an external device through the communication apparatus 400, transmit a control signal to the vehicle operating apparatus 600, and perform driving of the vehicle 100.

The parking exit system 740 may perform an exit of the vehicle 100 from a parking lot.

The parking exit system 740 may receive navigation information from the navigation system 770, transmit a control signal to the vehicle operating apparatus 600, and perform the exit of the vehicle 100 from the parking lot.

The parking exit system 740 may receive object information from the object detecting apparatus 300, transmit a control signal to the vehicle operating apparatus 600 and perform the exit of the vehicle 100 from the parking lot.

The parking exit system 740 may receive a signal from an external device through the communication apparatus 400, transmit a control signal to the vehicle operating apparatus 600, and perform the exit of the vehicle 100 from the parking lot.

The parking system 750 may perform parking of the vehicle 100.

The parking system 750 may receive navigation information from the navigation system 770, transmit a control signal to the vehicle operating apparatus 600, and park the vehicle 100.

The parking system 750 may receive object information from the object detecting apparatus 300, transmit a control signal to the vehicle operating apparatus 600 and park the vehicle 100.

The parking system 750 may receive a signal from an external device through the communication apparatus 400, transmit a control signal to the vehicle operating apparatus 600, and park the vehicle 100.

The navigation system 770 may provide navigation information. The navigation information may include at least one of map information, information regarding a set destination, path information according to the set destination, information regarding various objects on a path, lane information and current location information of the vehicle.

The navigation system 770 may include a memory and a processor. The memory may store the navigation information. The processor may control an operation of the navigation system 770.

According to embodiments, the navigation system 770 may update prestored information by receiving information from an external device through the communication apparatus 400.

According to embodiments, the navigation system 770 may be classified as a sub component of the user interface apparatus 200.

The sensing unit 120 may sense a status of the vehicle. The sensing unit 120 may include a posture sensor (e.g., a yaw sensor, a roll sensor, a pitch sensor, etc.), a collision sensor, a wheel sensor, a speed sensor, a tilt sensor, a weight-detecting sensor, a heading sensor, a gyro sensor, a position module, a vehicle forward/backward movement sensor, a battery sensor, a fuel sensor, a tire sensor, a steering sensor by a turn of a handle, a vehicle internal temperature sensor, a vehicle internal humidity sensor, an ultrasonic sensor, an illumination sensor, an accelerator position sensor, a brake pedal position sensor, and the like.

The sensing unit 120 may acquire sensing signals with respect to vehicle-related information, such as a pose, a collision, an orientation, a position (GPS information), an angle, a speed, an acceleration, a tilt, a forward/backward movement, a battery, a fuel, tires, lamps, internal temperature, internal humidity, a rotated angle of a steering wheel, external illumination, pressure applied to an accelerator, pressure applied to a brake pedal and the like.

The sensing unit 120 may further include an accelerator sensor, a pressure sensor, an engine speed sensor, an air flow sensor (AFS), an air temperature sensor (ATS), a water temperature sensor (WTS), a throttle position sensor (TPS), a TDC sensor, a crank angle sensor (CAS), and the like.

The interface unit 130 may serve as a path allowing the vehicle 100 to interface with various types of external devices connected thereto. For example, the interface unit 130 may be provided with a port connectable with a mobile terminal, and connected to the mobile terminal through the port. In this instance, the interface unit 130 may exchange data with the mobile terminal.

In some examples, the interface unit 130 may serve as a path for supplying electric energy to the connected mobile terminal. When the mobile terminal is electrically connected to the interface unit 130, the interface unit 130 supplies electric energy supplied from a power supply unit 190 to the mobile terminal according to the control of the controller 170.

The memory 140 is electrically connected to the controller 170. The memory 140 may store basic data for units, control data for controlling operations of units and input/output data. The memory 140 may be a variety of storage devices, such as ROM, RAM, EPROM, a flash drive, a hard drive and the like in a hardware configuration. The memory 140 may store various data for overall operations of the vehicle 100, such as programs for processing or controlling the controller 170.

According to embodiments, the memory 140 may be integrated with the controller 170 or implemented as a sub component of the controller 170.

The controller 170 may control an overall operation of each unit of the vehicle 100. The controller 170 may be referred to as an Electronic Control Unit (ECU).

The power supply unit 190 may supply power required for an operation of each component according to the control of the controller 170. Specifically, the power supply unit 190 may receive power supplied from an internal battery of the vehicle, and the like.

At least one processor and the controller 170 included in the vehicle 100 may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro controllers, microprocessors, and electric units performing other functions.

In some examples, the vehicle 100 may include a route guidance device 800.

The route guidance device 800 may control at least one of those components illustrated in FIG. 7. From this perspective, the route guidance device 800 may be the controller 170.

Without a limit to this, the route guidance device 800 may be a separate device, independent of the controller 170. When the route guidance device 800 is implemented as a component independent of the controller 170, the route guidance device 800 may be provided on a part of the vehicle 100.

Hereinafter, a description will be given of an example in which the route guidance device 800 is a separate component independent of the controller 170, for the sake of explanation. In this specification, functions (operations) and control methods described in relation to the route guidance device 800 may be executed by the controller 170 of the vehicle. That is, every detail described in relation to the route guidance device 800 may be applied to the controller 170 in the same/like manner.

Also, the route guidance device 800 described herein may include some of the components illustrated in FIG. 7 and various components included in the vehicle. For the sake of explanation, the components illustrated in FIG. 7 and the various components included in the vehicle will be described with separate names and reference numbers.

Figure 8:
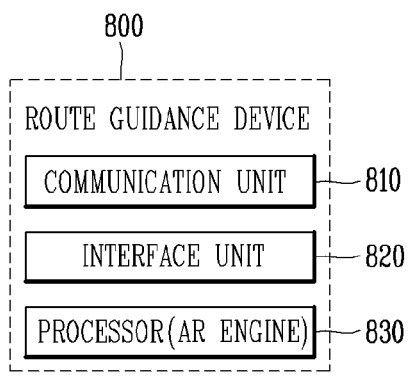
FIG. 8 is a block diagram illustrating a route guidance device in accordance with the present disclosure.

FIG. 8 is a block diagram illustrating a route guidance device in accordance with the present disclosure.

A route guidance device 800 according to an embodiment of the present disclosure may include a communication unit 810, an interface unit 820, and a processor 830.

The communication unit 810 may be configured to perform wireless communication with at least one of electrical components included in the vehicle (e.g., the electrical components included in the vehicle illustrated in FIG. 7).

In addition, the communication unit 810 may perform communication with devices other than the vehicle, for example, mobile terminals, servers, other vehicles, infrastructures located on roads, and the like.

The communication unit 810 may be the communication apparatus 400 described above, and may include at least one of those components included in the communication apparatus 400.

The interface unit 820 may perform communication with at least one of the components disposed in the vehicle.

Specifically, the interface unit 820 may perform wired communication with at least one of the electrical components included in the vehicle illustrated in FIG. 7.

Specifically, the interface unit 820 receives sensing information from one or more sensors disposed at the vehicle 100.

In some cases, the interface unit 820 may be referred to as a sensor data collector.

The interface unit 820 collects (receives) information sensed by sensors (V.Sensors) (e.g., heading, throttle, break, wheel, etc.) disposed at the vehicle for detecting a manipulation of the vehicle, and sensors (S.Sensors) (e.g., Camera, Radar, LiDAR, Sonar, etc.) for detecting surrounding information of the vehicle.

The interface unit 820 may transmit the information sensed through the sensors disposed at the vehicle to the communication unit 810 (or the processor 830) so that the information is reflected in an HD map.

The interface unit 820, for example, may serve as a passage with the electrical components disposed in the vehicle through the interface unit 130 of the vehicle.

The interface unit 820 may exchange data with the interface unit 130 of the vehicle.

The interface unit 820 may be connected to the vehicle to serve as a path for receiving electrical energy.

For example, the route guidance device may be powered on by receiving electrical energy from the power supply unit 190 of the vehicle through the interface unit 820.

Meanwhile, the route guidance device according to the present disclosure may include a processor 830 for generating a digital twin 3D map using at least one of an image captured by the camera disposed in the vehicle, 2D map information, and 3D map information.

For example, the processor 830 may generate a digital twin 3D map in which a real image (i.e., an image captured by the camera disposed in the vehicle) is reflected in at least one of 2D map information and 3D map information.

The digital twin 3D map may refer to a 3D map generated by reflecting parameters of a real image in 2D map information or 3D map information.

That is, the meaning that the real image is reflected in the 2D map information or the 3D map information may include meaning that parameters of the real image are reflected in the 2D map information or the 3D map information.

The processor 830 may overlay (overlap or output) a graphic object related to route guidance on the digital twin 3D map.

Here, the graphic object related to the route guidance indicates an object output in augmented reality, and may include various types of objects (e.g., POI objects, carpet-type objects, 3D objects, etc.) that are necessary to perform the route guidance.

The graphic object related to the route guidance may also be named an AR object.

In addition, the processor 830 may perform route guidance using a digital twin 3D map on which the graphic object related to the route guidance is overlaid.

That is, the processor 830 may overlay the graphic object related to the route guidance on the digital twin 3D map, and perform a route guidance function (i.e., an AR navigation screen output function) using the digital twin 3D map overlaid with the graphic object related to the route guidance.

Hereinafter, a description will be given in detail of a method of generating a digital twin 3D map and a method of performing route guidance using the digital twin 3D map, with reference to the accompanying drawings.

Figure 9:
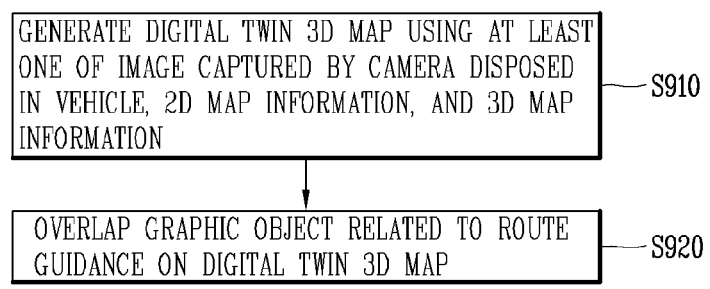
FIG. 9 is a flowchart illustrating a representative control method in accordance with the present disclosure.

FIG. 9 is a flowchart illustrating a representative control method according to the present disclosure, and FIGS. 10, 11, 12, and 13 are conceptual diagrams illustrating various methods of generating a digital twin 3D map in accordance with the present disclosure.

The route guidance device according to the present disclosure may perform an Augmented Reality (hereinafter, referred to as AR) service, that is, an AR service by utilizing 3D map data.

In the related art, augmented reality was implemented in the real world by outputting an AR object on a HUD or a windshield of a vehicle, or by outputting the AR object on an image (for example, a preview image or a live image) captured in real time by a camera.

In particular, the related art AR navigation, which provides route guidance using an augmented reality technology, renders several objects expressed in AR on a live video. This causes a problem that the AR object is not accurately mapped onto a desired position due to an inaccurate vehicle position, inaccurate GPS coordinates of POIs taken from a map, errors caused by height information errors, and the like.

In addition, as described above, the related art AR navigation outputs a 3D object on an image (e.g., a 2D video frame) captured through a camera, which fails to reflect an accurate phase information.

For example, problems, such as a carpet-type object being output on a building or another vehicle at an intersection, a POI being output on a wrong position, a POI on a hillside being output in the air, and the like, are caused because an object having 3D spatial coordinates is output on a 2D video frame.

In order to solve these problems, the processor 830 according to the present disclosure may generate a digital twin 3D map using at least one of an image captured by the camera disposed in the vehicle, 2D map information, and 3D map information (S910).

Thereafter, the processor 830 may overlay (overlap or output) a graphic object related to route guidance (e.g., various objects (an AR object) used in augmented reality) on the digital twin 3D map (S920).

The processor 830 may be referred to as an 'AR engine' in terms of implementing the augmented reality technology.

The processor 830 may receive an image captured by the camera disposed in the vehicle through the interface unit 820 (or the communication unit 810).

In the present disclosure, receiving specific information or data through the interface unit 820 may include the meaning of receiving specific information or data through the communication unit 810.

The route guidance device according to an embodiment of the present disclosure may further include a memory (not illustrated) for storing 2D map information and 3D map information.

Meanwhile, without being limited thereto, the route guidance device may receive 2D map information and 3D map information stored in the vehicle through the interface unit 820, or the processor 830 may directly generate the 2D map information and the 3D map information.

The processor 830 may generate a digital twin 3D map using at least one of the image captured by the camera disposed in the vehicle, the 2D map information, and the 3D map information.

Here, digital twinning refers to implementing real-world (physical) machines, equipment, objects, etc. in a virtual world through a computer.

This digital twinning is being used as a technology that creates an identical object to (twin of) a real object in a virtual space and verifies the created object through various simulations.

Digital twinning is a technology that creates a twin of an actual real-world object on a computer, simulates situations to occur in the real world on the computer, and predicts results in advance.

That is, the digital twin 3D map described in the present disclosure may be understood as a 3D map in which an actual situation (or a real space) is equally created in a virtual space.

Unlike 3D map information simply implemented by points, lines, and planes, the digital twin 3D map is distinguished from the 3D map information in that an actual real-world situation (or object) is represented in a 3D virtual world.

To this end, the processor 830 may generate a digital twin 3D map by mapping an image captured by the camera onto 3D map information.

The processor 830 may determine a position where the image photographed by the camera is mapped to the 3D map information, by using 2D map information.

In addition, the processor 830 may delete a 3D block corresponding to an object, which does not exist in reality, from the 3D map information or may add a 3D block corresponding to an object existing in reality, based on the 2D map information and the 3D map information. That is, the processor 830 may update 3D blocks included in the 3D map information according to a real situation based on the 2D map information and the 3D map information.

In addition, the processor 830 may overlay an image captured by the camera on a 3D block included in the 3D map information. At this time, the processor 830 may determine a position of the 3D block, on which the image captured by the camera is to be overlaid, using the 2D map information.

Figure 10:
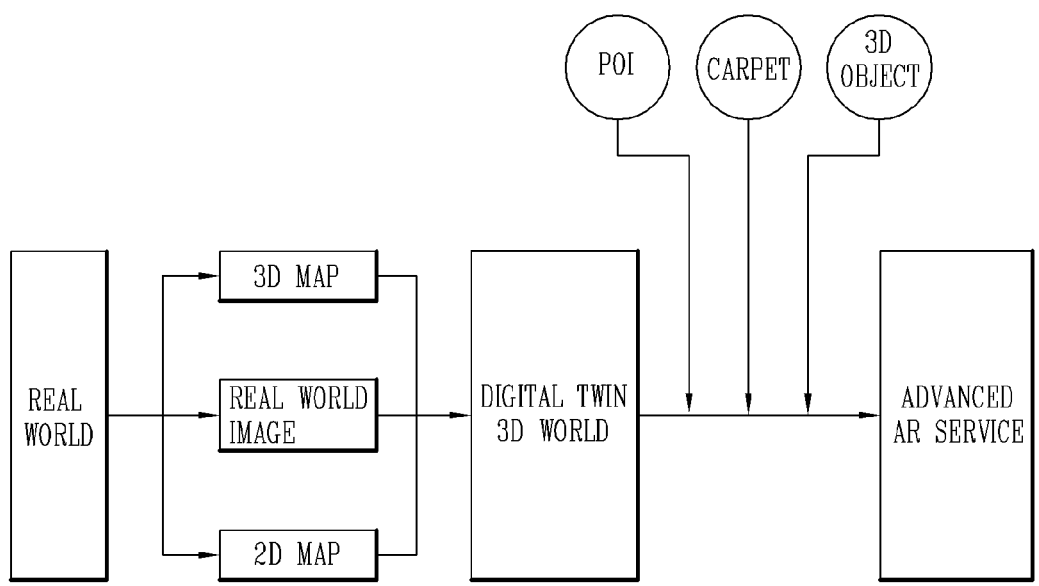
FIGS. 10, 11, 12, and 13 are conceptual diagrams illustrating various methods of generating a digital twin 3D map in accordance with the present disclosure.
Figure 11:
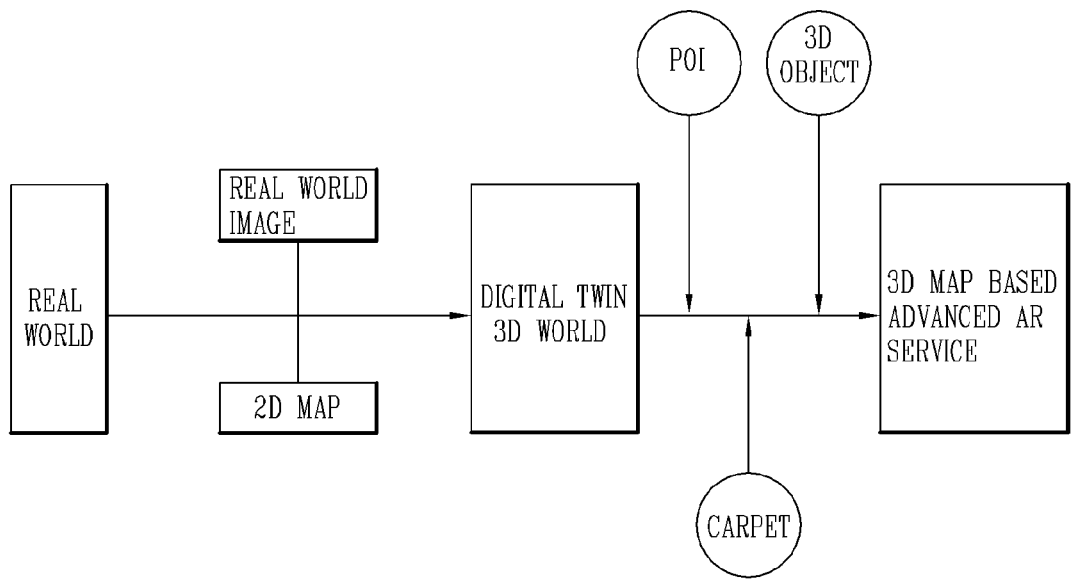
Figure 12:
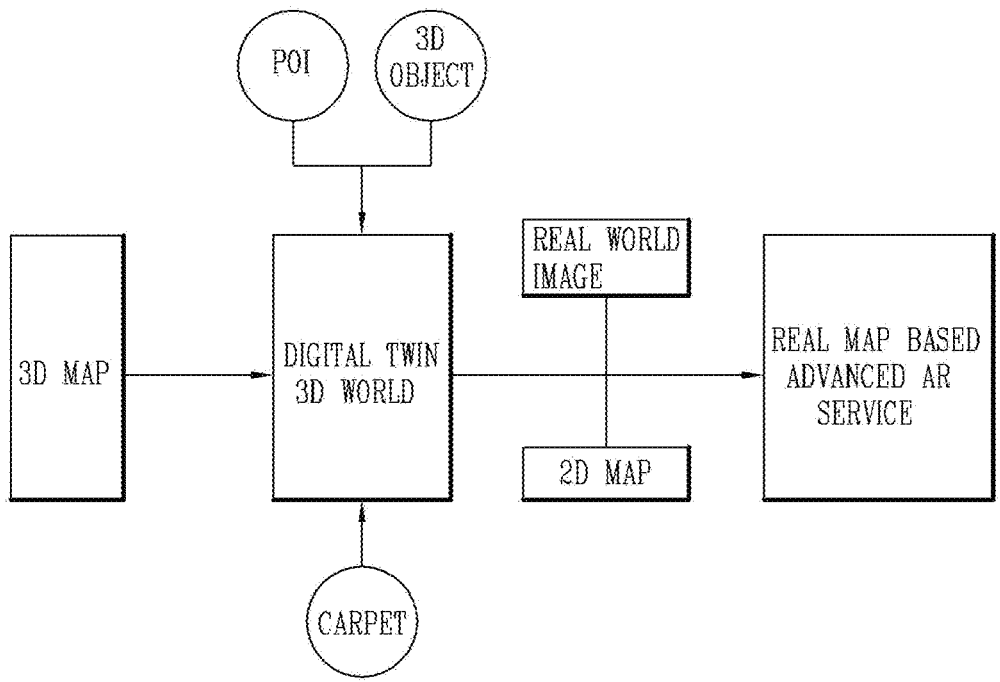

As a method for generating a digital twin, various methods may be used as illustrated in FIGS. 10 to 12.

First of all, referring to FIG. 10, in a digital twin 3D map disclosed herein, all objects in the map are accurately matched in a 3D coordinate system. Accordingly, the present disclosure may represent exact positions of desired objects (objects related to a route, POIs/AR objects) in the 3D coordinate system using the digital twin 3D map.

The processor 830 may generate (acquire) 3D map information in the real world through sensors, and locate objects including all buildings in accurate sizes on exact positions on the generated 3D map information.

However, this 3D map information is realized by only lines and planes. In order to map (paste, attach) images identical to the real world onto each surface of the 3D map information, images (e.g., 360-degree images) that are obtained from the camera of the vehicle or acquired at the time of constructing a 3D map are used.

2D map information is used to accurately locate an actual real-world image on an object (3D block included in 3D map information) where the image should exist, and to remove unnecessary objects (or 3D blocks).

The 2D map information is used as a major element of a navigation and is mainly used when performing route guidance through the navigation.

The processor 830 may recheck (redetermine) the position of each building or POI based on the 2D map information and map a real-world image acquired through the camera onto a 3D block of the 3D map information.

In addition, the processor 830 may also remove objects such as unnecessary vehicles, people, street stalls, or street trees using the 2D map information.

Through this configuration of the present disclosure, an object to be rendered in AR may be output on an accurate position in an accurate space.

Meanwhile, unlike the description of FIG. 10, the processor 830 may receive 3D map information from an external server without directly generating the 3D map information.

Referring to FIG. 11, the present disclosure may utilize a digital twin 3D map by utilizing an external server (e.g., a point cloud, etc.).

For example, the processor 830 may receive 3D map information from an external server, and match an image captured by the camera of the vehicle and 2D map information with the received 3D map information to create a digital twin 3D virtual world (digital twin 3D map).

The processor 830 may provide an advanced AR service by rendering a graphic object related to route guidance (e.g., an AR object such as POI).

In other words, the embodiment of FIG. 11 will be understood as constructing a digital twin 3D map by matching 2D map information for processing accurate positioning with real-world images for overlaying real images on the digital twin 3D map, and providing an advanced AR Service by displaying POIs and the like on the constructed digital twin 3D map.

Through this configuration of the present disclosure, a clean AR Service may be provided by utilizing a digital twin 3D map for an area when it is difficult to check a road surface due to heavy rain, snow, or fog in the area.

Referring to FIG. 12, the processor 830 may receive a digital twin 3D map, which is generated by matching real-world images with 3D map information, from an external server (such as a point cloud).

The processor 830 may position AR objects such as POIs on the digital twin 3D map, and then match 2D map information with a video (image) captured through the camera of the vehicle, thereby providing an advanced AR service based on an actual real-world image and the 2D map.

In this method, after overlaying a graphic object (an AR service element such as POI) related to route guidance on 3D map information in which a real-world image is not reflected, the information is projected (applied) on an image (a real-world image) captured through the camera in consideration of the 2D map information.

That is, the case of FIG. 12 is different from the cases of FIGS. 10 and 11 in view of determining a position, on which a graphic object related to route guidance is overlaid on an image (a real-time image) captured through the camera of the vehicle, using a digital twin 3D map and outputting the graphic object.

That is, referring to FIG. 12, the route guidance device according to the present disclosure may output an AR service element such as POI by virtually creating a 3D space on a 2D real-world video image, and output an AR object on the video more accurately than an existing AR navigation.

Meanwhile, the method described in FIGS. 10 to 12 may be performed based on a satisfaction of a preset condition.

In detail, the processor 830 may create a digital twin 3D map and overlay a graphic object related to route guidance on the digital twin 3D map when a preset condition is satisfied.

The preset condition may include at least one of a case corresponding to a specific weather condition and a case where another object exists, instead of an object on which a graphic object related to route guidance is to be overlaid.

In short, the present disclosure may provide an advanced AR Service of representing AR information using digital twin 3D map data.

Figure 13:
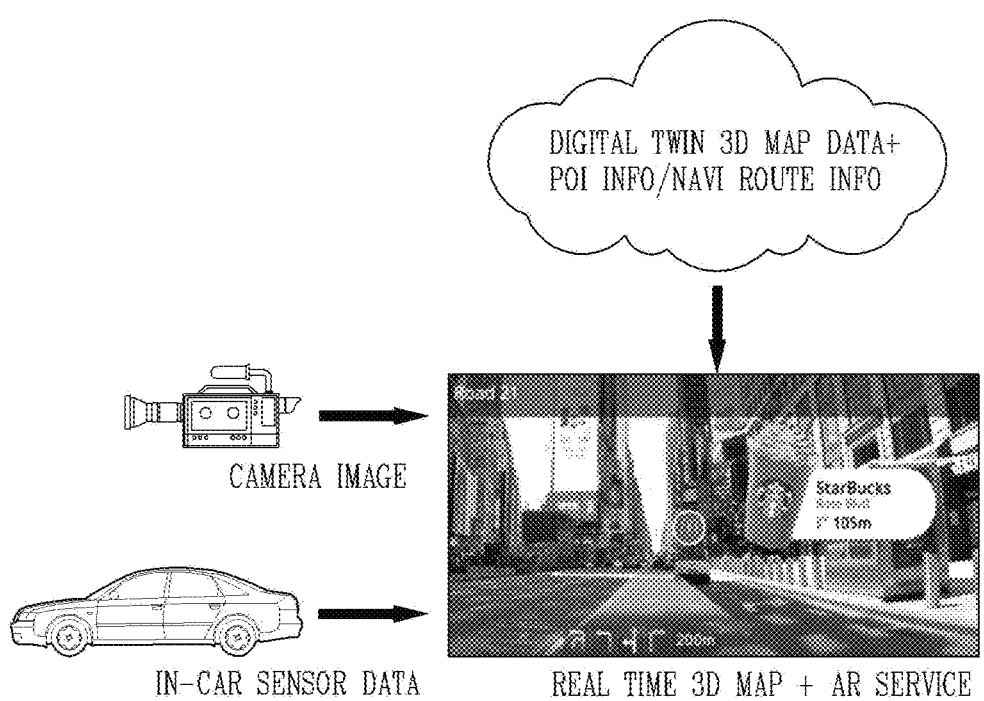

Referring to FIG. 13, as one embodiment of the present disclosure, a real-world image may be reflected in 3D map information by mapping AR information onto digital twin 3D map data, and AR information (a graphic object related to route guidance, namely, an AR object) may be output on the 3D map data (i.e., the digital twin 3D map) matched with the real-world image data.

In addition, in order to create a digital twin 3D map more realistically in the present disclosure, a digital twin 3D map may be updated by utilizing images captured through the camera of the vehicle in real time/periodically and data sensed through sensors disposed in the vehicle, and a digital twin 3D map for a new space may be generated.

In the present disclosure, accurate phase information may be acquired by utilizing a digital twin 3D map and a visual positioning service (VPS), and an advanced AR service having a clean view may be provided by utilizing the digital twin 3D map even when it is difficult to secure visibility due to bad weather.

That is, referring to FIG. 13, a digital twin 3D map may be received through a server or data embedded in a vehicle may be used, and the processor 830 may map each real-world object into a 3D map space by utilizing a real-world image received from the camera of the vehicle as a texture.

The real-world image received from the camera of the vehicle may be used to more precisely position the vehicle and POI through a VPS technology.

As the real-world images for matching actual images in real time, images in other vehicles and images captured in a corresponding area in the past as well as images in the vehicle of the present disclosure may be used.

In addition, the processor 830 may render each real-world object for an AR service in a corresponding space.

On the other hand, the technology for implementing augmented reality using the digital twin 3D map may be performed independently in the route guidance device, but is not limited thereto.

The advanced AR Service using the digital twin 3D map described in the present disclosure may be implemented by a route guidance system including a server and a route guidance device that may be disposed in a vehicle.

Figure 14:
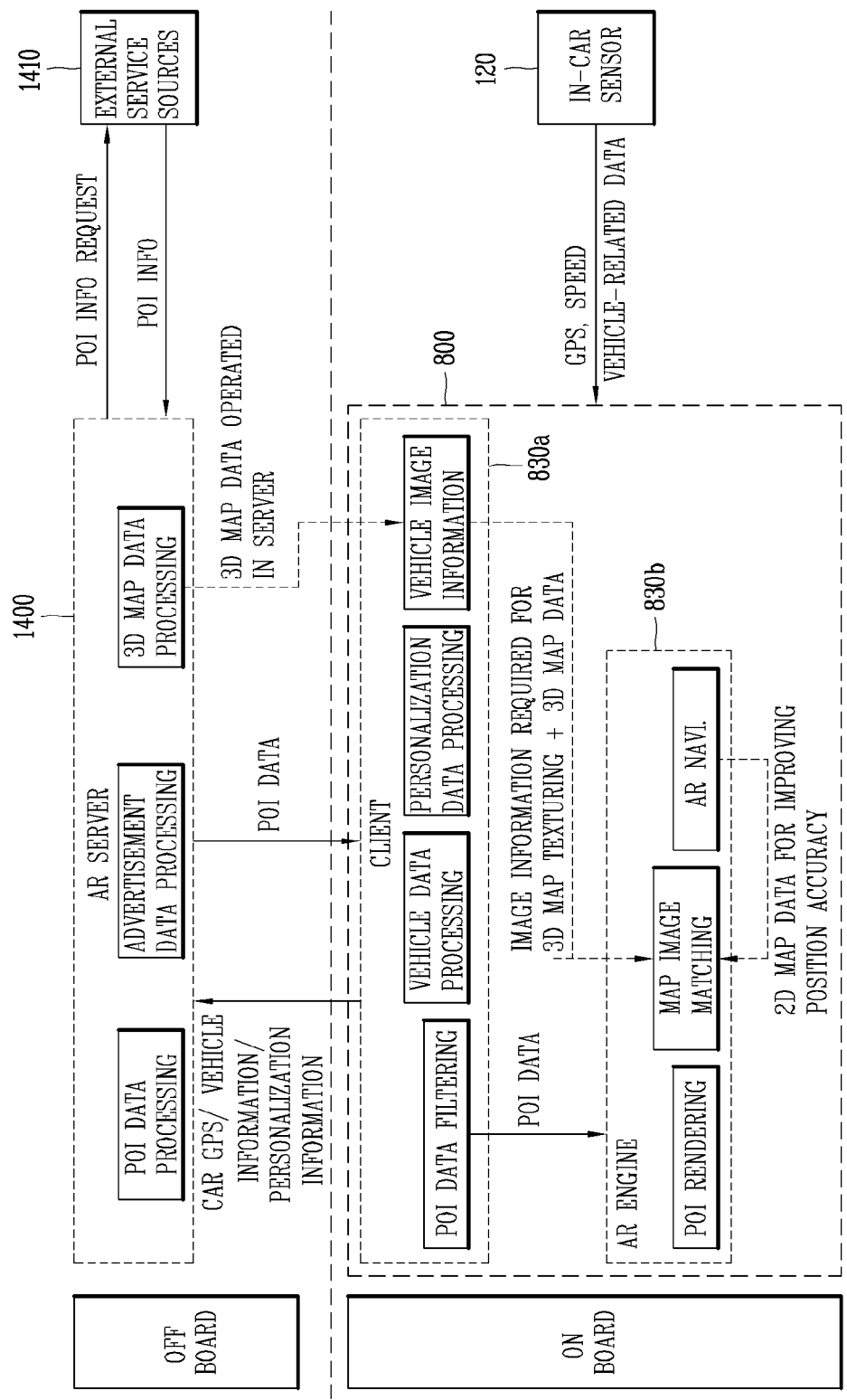
FIGS. 14, 15, and 16 are conceptual diagrams illustrating various embodiments of a route guidance system in accordance with the present disclosure.
Figure 15:
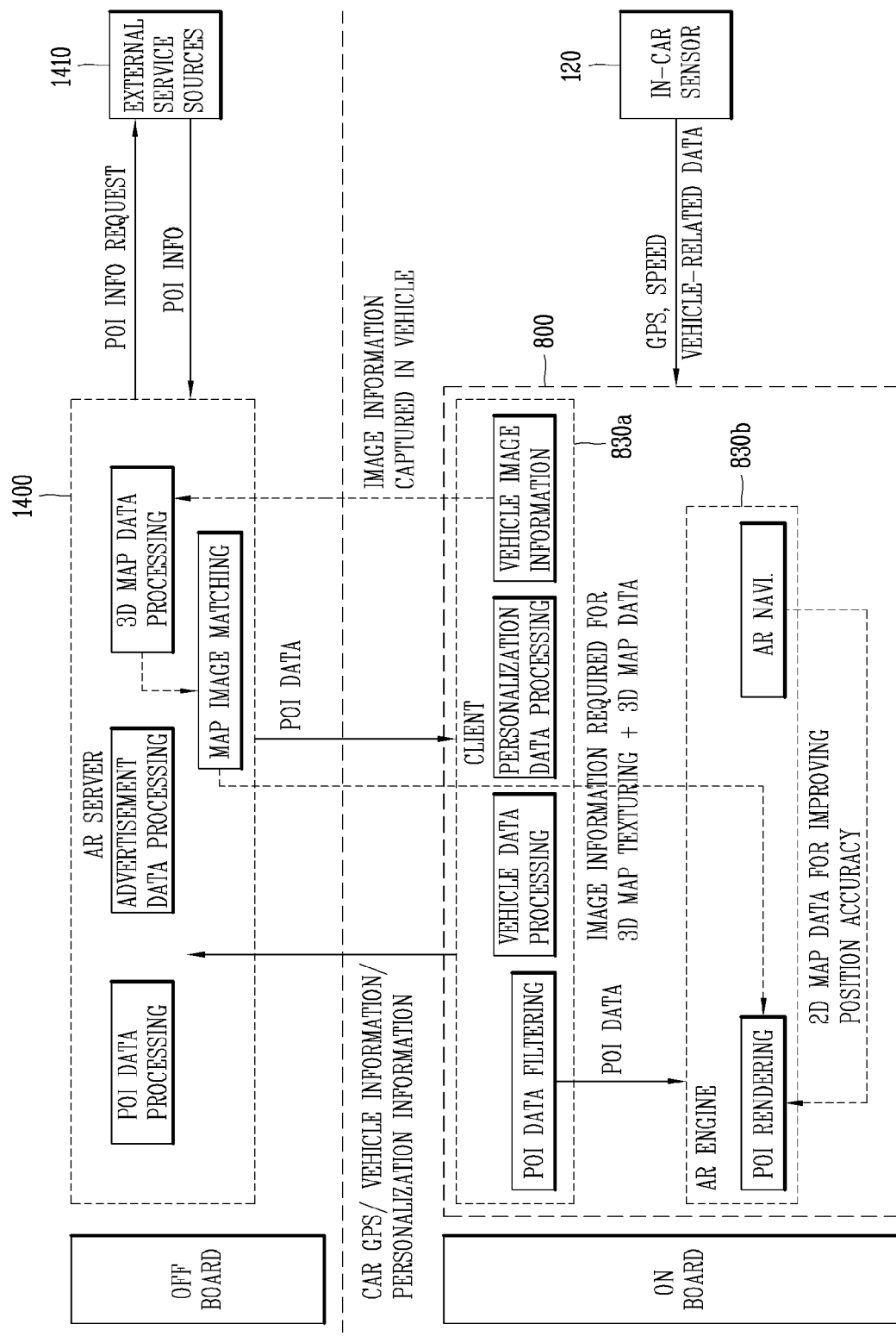
Figure 16:
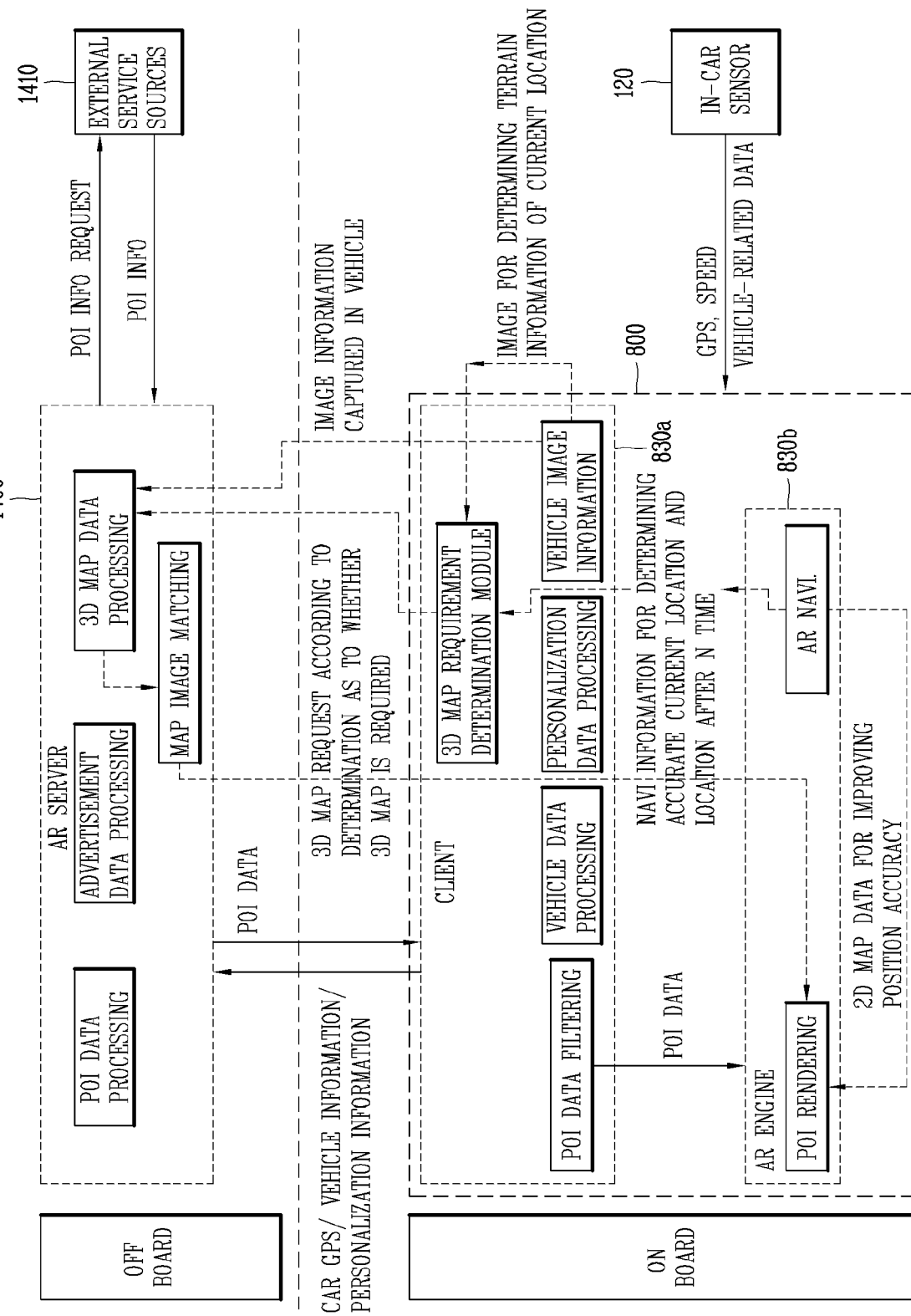

FIGS. 14, 15, and 16 are conceptual diagrams illustrating various embodiments of a route guidance system in accordance with the present disclosure.

Referring to FIG. 14, a route guidance system according to the present disclosure may include a server 1400 that transmits 3D map information, and a route guidance device 800 that senses vehicle-related information through sensors disposed in the vehicle, and generates a digital twin 3D map by matching the sensed vehicle-related information with the 3D map information received from the server.

As described above with reference to FIGS. 9 to 13, the route guidance device 800 may overlay and output a graphic object related to route guidance on the digital twin 3D map.

The route guidance device may include a camera disposed in the vehicle to capture images, and an AR engine 130b (or processor 830) to generate a digital twin 3D map by mapping the images captured through the camera onto 3D map information.

The AR engine 830b may analogically perform the function/operation/control method of the processor 830 described above with reference to FIGS. 9 to 13 in the same/similar manner.

The AR engine 830b may determine a position where the image captured by the camera is mapped to the 3D map information, by using 2D map information.

Referring to FIG. 14, a route guidance system according to one embodiment of the present disclosure may include a server 1400 and an external service source server 1410 in an off-board configuration existing outside a vehicle.

The server 1400 may process POI data, advertisement data, and 3D map data, request POI information from the external service source server 1410, and receive the POI information.

The server 1400 may be referred to as an AR server in terms of creating/processing/providing an object that provides an AR service.

The server 1400 may perform communication with the route guidance device 800, which is an on-board configuration disposed in the vehicle, to transmit/receive data.

On-board components provided in the vehicle may include a route guidance device 800 and a sensor 120 disposed in the vehicle. The sensor 120 may be the sensing unit 120 described with reference to FIG. 7.

The route guidance device 800 may include the processor 830. The processor 830 may include a client 830a that filters POI data, processes vehicle data, processes personalization data, and manages vehicle image information, and an AR engine 830b that renders POI information to be output in augmented reality, matches the rendered POI information with images, 3D map information, or a digital twin 3D map, and performs an AR navigation function.

It may be understood that the functions performed by the client 830a and the AR engine 830b are performed by the processor 830.

The route guidance device 800 may receive information related to the vehicle, such as a location (GPS) of the vehicle, a speed of the vehicle, and the like from the sensor 120 of the vehicle.

The client 830a may process the vehicle-related information and transmit the processed vehicle-related information to the server 1400.

The server 1400 may transmit 3D map information corresponding to a corresponding location to the vehicle based on the vehicle-related information, which includes the location of the vehicle and the speed of the vehicle, transmitted from the vehicle.

The client 830a may receive 3D map information from the server 1400 and transmit an image (image information) to be mapped on the 3D map information, among images captured by the camera of the vehicle, to the AR engine 830b.

Also, the AR engine 830b may include an AR navigation that uses 2D map information.

The AR engine 830b may generate a digital twin 3D map using the 3D map information transmitted from the server, the image captured by the camera of the vehicle, and the 2D map information transmitted from the AR navigation, and overlay (render) a graphic object related to route guidance on the digital twin 3D map, thereby performing the route guidance.

To match real-world images in real time, the AR engine 830b may use not only an image in the vehicle of the present disclosure but also images in other vehicles and images captured in a corresponding area in the past.

On the other hand, in the route guidance system according to the present disclosure, the digital twin 3D map may be generated not only in the route guidance device of the vehicle but also in the server, and the generated digital twin 3D map may be transmitted to the vehicle.

Referring to FIG. 15, the route guidance device 800 may transmit an image obtained through the camera disposed in the vehicle to the server 1400.

The image transmitted to the server 1400 may be associated with location information where the corresponding image has been captured, and this may be performed by the camera of the vehicle, the controller, or the route guidance device.

The server 1400 may generate a digital twin 3D map by mapping the image received from the vehicle onto 3D map information, and transmit the generated 3D map to the route guidance device.

Thereafter, the route guidance device 800 may overlay a graphic object related to route guidance on the digital twin 3D map received from the server 1400.

At this time, the route guidance device 800 may determine a location, at which the graphic object related to route guidance is to be mapped on the digital twin 3D map, using 2D map information.

That is, the server 1400 may extract 3D map information based on location information and speed information transmitted from the vehicle.

The route guidance device 800 of the vehicle may transmit image information, which is input in real time from the camera located on a front or a rear side of a side surface of the vehicle, to the server.

The server 1400 generates a digital twin 3D map by performing 3D map matching based on the extracted 3D map information and the real-time image information transmitted from the vehicle (route guidance device), and transmits the generated 3D map to the AR engine 830b of the route guidance device.

The AR engine 830b renders POI information within the digital twin 3D map based on the digital twin 3D map transmitted from the server, the POI information (the graphic object related to route guidance), and the 2D map information transmitted from the AR navigation.

Meanwhile, the route guidance device may transmit the vehicle-related information obtained from the vehicle to the server 1400.

The server 1400 may generate a digital twin 3D map based on the vehicle-related information received from the route guidance device 800.

The vehicle-related information may include a location of the vehicle, a speed of the vehicle, and an image captured in the vehicle.

At this time, the route guidance device 800 may determine, based on the image obtained through the camera, whether or not a preset condition that requires for route guidance through the digital twin 3D map is satisfied. When it is determined that the preset condition is satisfied, the route guidance device 800 may transmit the image to the server and receive the digital twin 3D map from the server.

For example, the preset condition may include a case where there is a graphic object which should be exposed at a place where the vehicle is to be located after a predetermined time elapses based on 2D map information.

Referring to FIG. 16, the route guidance device 800 may further include a module 1600 for determining whether a digital twin 3D map is required.

The processor 830 (the client 830a) of the route guidance device 800 may request a digital twin 3D map from the server when a preset condition is satisfied.

The preset condition may include whether a current location of the vehicle is in a downtown area with many buildings, whether the vehicle is expected to enter a downtown area with many building after n minutes even if the current location of the vehicle is in an outlying area without a building that may be hidden by POI, whether it is difficult to secure visibility due to poor weather conditions, whether an advertisement wall that needs to be fitted to a specific object at the current location or at a location after n minutes is designated, whether a digital twin 3D map is secured at the current location or at a location after n minutes, and whether there is a graphic object which should be exposed at a place where the vehicle is to be located after a predetermined time elapses based on 2D map information.

Whether or not the digital twin 3D map is secured at the current time means whether the digital twin 3D map currently exists in the route guidance device, and may change to another condition later when the digital twin 3D map is secured in a whole range or can be secured in real time.

Whether or not the 3D map is necessary may be determined by each vehicle or route guidance device, or may also be determined by the server receiving a current image of each vehicle and navigation route information.

The client 830a may transmit an image acquired through the camera disposed in the vehicle to a determination module 1600 and request for a digital twin 3D map from the server 1400 based on a determination result of the determination module. At this time, the client 830a may transmit vehicle-related information and the image captured in the vehicle to the server.

The server may transmit the digital twin 3D map to the AR engine 830b based on the vehicle-related information and the image captured in the vehicle.

The AR engine 830b may map a graphic object (POI information) related to route guidance on the received 3D map, and at this time, may determine a position where the graphic object is to be mapped based on 2D map information existing in the AR navigation.

Figure 17:
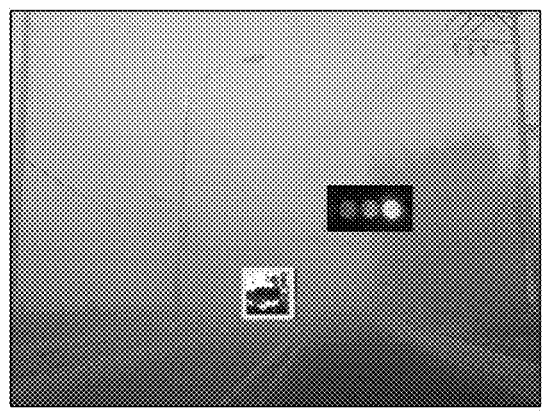
FIGS. 17, 18, and 19 are conceptual diagrams illustrating the control method illustrated in FIG. 9.
Figure 18:
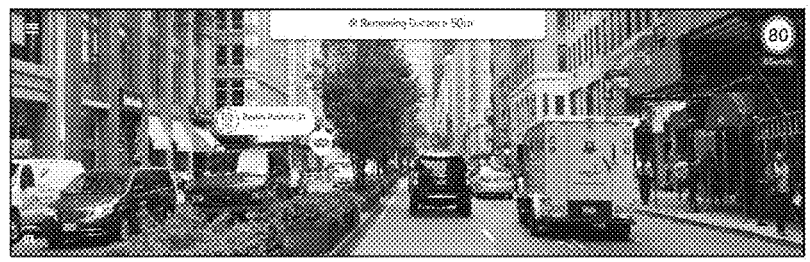
Figure 19:
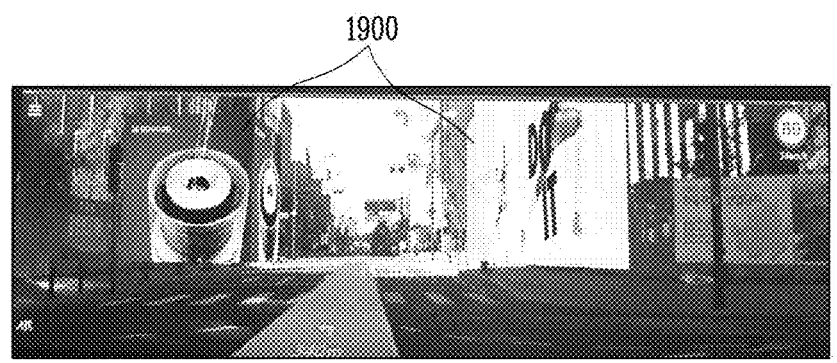

FIGS. 17, 18, and 19 are conceptual diagrams illustrating the control method illustrated in FIG. 9.

In the present disclosure, a route guidance is performed by implementing augmented reality on such a digital twin 3D map. Accordingly, as illustrated in FIG. 17, when it is difficult to secure visibility in front due to fog, snow, or rain, information related to lanes and traffic lights that are difficult to see well is provided in AR by using a previously-secured digital 3D map, the current location of the vehicle, V2X communication, and the like.

As illustrated in FIG. 17, the processor 830 may also output a location of another vehicle adjacent to the vehicle on a digital twin 3D map based on vehicle-to-vehicle communication, vision, radar information, and the like.

In addition, the processor 830 may request a digital twin 3D map from the server in order to use a clean view when it is difficult to secure visibility due to weather conditions even if the vehicle is currently located in a forest road or highway without a building. In this case, a clean image captured in the past may be mapped instead of a current image.

In addition, as illustrated in FIG. 18, when augmented reality is implemented using a digital twin 3D map of the present disclosure, it is possible to solve a problem that an area hidden by an adjacent building is invisible.

That is, the processor 830 may accurately map a texture (graphic object) onto a desired building using the digital twin 3D map. Even if the building is actually hidden by another adjacent building, the processor 830 may accurately overlay the graphic object on the desired building by way of not outputting the another building that hides the desired building or lowering transparency of the another building.

In addition, the processor 830 provides only a basic AR navigation service, such as an AR carpet and the like, when the vehicle is currently located at a position where there is no building hiding POI, for example, in a highway or a forest road.

Thereafter, the processor 830 may request a 3D Map from the server when the vehicle is expected to enter a downtown area with many buildings after n minutes based on a route and when a digital twin 3D map for the corresponding area is secured.

In addition, referring to FIG. 19, the processor 830 may use a digital twin 3D map for an accurate overlap (fitting) when the vehicle is currently located at a place where a wall (virtual wall) 1900 for a specific advertisement is scheduled to be fit even if there is not a building, such as a highway or forest road, blocking POI.

The wall 1900 may be located in various places, such as a corner of a road, a specific sign, a building like a distribution center or a large-scale factory that uses nearby large sites, and natural objects such as nearby mountain, river, and lake. To accurately fit the wall 1900 to the corresponding position, a digital twin 3D map may be used.

Hereinafter, effects of a route guidance device and a route guidance system according to the present disclosure will be described.

First, the present disclosure may provide a new route guidance interface capable of implementing augmented reality using a digital twin 3D map.

Second, the present disclosure may overcome various problems that occur when augmented reality is implemented on a real-world image or a real-world space by overlaying a graphic object implemented in augmented reality on a digital twin 3D map.

Third, the present disclosure may provide a new AR navigation service that can provide a route guidance service in augmented reality through a digital twin 3D map in collaboration with a server and a vehicle.

The present disclosure can be implemented as computer-readable codes (applications or software) in a program-recorded medium. The method of controlling the autonomous vehicle can be realized by a code stored in a memory or the like.

The computer readable medium includes all kinds of recording devices in which data readable by a computer system is stored. Examples of the computer-readable medium include a hard disk drive (HDD), a solid state disk (SSD), a silicon disk drive (SDD), a ROM, a RAM, a CD-ROM, a magnetic tape, a floppy disk, an optical data storage device and the like, and may also be implemented in the form of a carrier wave (e.g., transmission over the Internet). The computer may include the processor or the controller. Therefore, the detailed description should not be limitedly construed in all of the aspects, and should be understood to be illustrative. Therefore, all changes and modifications that fall within the metes and bounds of the claims, or equivalents of such metes and bounds are therefore intended to be embraced by the appended claims.

The invention claimed is:

1. A route guidance device comprising:
   an interface unit that communicates with at least one of components disposed in a vehicle; and
   a processor that generates a digital twin three-dimensional (3D) map using at least one of an image captured by a camera disposed in the vehicle, two-dimensional (2D) map information, and 3D map information,
   overlays a graphic object related to route guidance on the digital twin 3D map, and
   performs the route guidance using the digital twin 3D map with the graphic object related to the route guidance overlaid thereon,
   wherein the processor overlays the graphic object related to the route guidance on the digital twin 3D map by mapping a location of the graphic object onto the digital twin 3D map based on the 2D map information, and matches the 2D map information with the image captured by the camera disposed in the vehicle and displays the graphic object overlaid on the digital twin 3D map on the image captured by the camera that is aligned based on the 2D map information.

2. The route guidance device of claim 1, wherein the processor generates the digital twin 3D map by mapping the image captured by the camera to the 3D map information.

3. The route guidance device of claim 2, wherein the processor deletes a 3D block corresponding to an object, which does not exist in reality, from the 3D map information or adds a 3D block corresponding to an object existing in reality, based on the 2D map information and the 3D map information.

4. The route guidance device of claim 1, where the processor creates the digital twin 3D map and overlays a graphic object related to route guidance on the digital twin 3D map when a preset condition is satisfied.

5. The route guidance device of claim 4, wherein the preset condition includes at least one of a case corresponding to a specific weather condition or a case where another object exists, instead of an object on which the graphic object related to route guidance is to be overlaid.

6. A route guidance system comprising:
   a server that transmits three-dimensional (3D) map information; and
   a route guidance device that senses vehicle-related information from a sensor disposed in a vehicle, generates a digital twin 3D map by matching the sensed vehicle-related information with the 3D map information received from the server, overlays a graphic object related to route guidance on the digital twin 3D map, and performs the route guidance using the digital twin 3D map with the graphic object related to the route guidance overlaid thereon,
   wherein the route guidance device comprises:
   a camera disposed in the vehicle to capture an image; and
   an augmented reality (AR) engine that generates the digital twin 3D map by mapping the image captured by the camera to the 3D map information, and
   wherein the AR engine is provided with the digital twin 3D map, and renders the graphic object related to the route guidance on the provided digital twin 3D map based on two-dimensional (2D) map information.

7. The route guidance system of claim 6, wherein the AR engine determines a position where the image captured by the camera is mapped to the 3D map information, using the 2D map information.

8. The route guidance system of claim 6, wherein the route guidance device transmits an image obtained through a camera disposed in the vehicle to the server, and the server generates a digital twin 3D map by mapping the image to the 3D map information, and transmits the generated 3D map to the route guidance device.

9. The route guidance system of claim 8, wherein the route guidance device overlays a graphic object related to route guidance on the digital twin 3D map received from the server.

10. The route guidance system of claim 8, wherein the route guidance device determines whether a preset condition that requires for route guidance through the digital twin 3D map is satisfied, based on the image obtained through the camera, and transmits the image to the server and receives the digital twin 3D map from the server when the preset condition is satisfied.

11. The route guidance system of claim 10, wherein the preset condition includes a case where there is a graphic object which has to be exposed at a place where the vehicle is to be located after a predetermined time elapses based on the 2D map information.

\* \* \* \* \*